United States Patent
Dubnicki et al.

(10) Patent No.: US 8,214,517 B2
(45) Date of Patent: Jul. 3, 2012

(54) METHODS AND SYSTEMS FOR QUICK AND EFFICIENT DATA MANAGEMENT AND/OR PROCESSING

(75) Inventors: Cezary Dubnicki, Monmouth Junction, NJ (US); Erik Kruus, Hillsborough, NJ (US); Cristian Ungureanu, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 1035 days.

(21) Appl. No.: 11/566,139

(22) Filed: Dec. 1, 2006

(65) Prior Publication Data

US 2008/0133561 A1    Jun. 5, 2008

(51) Int. Cl.
  *G06F 15/16*    (2006.01)
  *G06F 7/00*    (2006.01)
  *G06F 17/00*    (2006.01)

(52) U.S. Cl. .......... 709/231; 709/247; 707/693

(58) Field of Classification Search .......... 709/231, 709/247; 707/101, 693
See application file for complete search history.

(56) References Cited

U.S. PATENT DOCUMENTS

| | | | |
|---|---|---|---|
| 5,655,117 A | 8/1997 | Goldberg | |
| 6,658,423 B1 | 12/2003 | Pugh et al. | 707/102 |
| 6,810,398 B2 | 10/2004 | Moulton | 707/6 |
| 7,103,602 B2 | 9/2006 | Black et al. | 707/101 |
| 2005/0131939 A1* | 6/2005 | Douglis et al. | 707/103 Y |
| 2005/0235043 A1* | 10/2005 | Teodosiu et al. | 709/217 |
| 2005/0256974 A1 | 11/2005 | Teodosiu | |
| 2005/0262167 A1 | 11/2005 | Teodosiu | |
| 2006/0047855 A1 | 3/2006 | Gurevich et al. | 709/247 |
| 2006/0112148 A1 | 5/2006 | Jennings, III et al. | 707/201 |
| 2006/0112264 A1 | 5/2006 | Agarwal | 713/150 |
| 2006/0282618 A1* | 12/2006 | Thompson et al. | 711/118 |

OTHER PUBLICATIONS

Eshghi et al., "A Framework for analyzing and improving content-based chunking algorithms", 2005, Hewlett-Packard, p. 1-11.*
Denehy et al., "IBM Research Report: Duplicate Management for Reference Data", Oct. 2003, IBM, p. 1-15.*
Bobbarjung et al., "Improving Duplicate Elimination in Storage Systems", Apr. 2005, ACM Transactions on Database Systems, p. 1-28.*
Muthitacharoen et al., "A Low-bandwidth Network File System", 2001, MIT Laboratory and NYU, p. 1-14.*
Dittrich, J.-P.; Seeger, B.;, "Data redundancy and duplicate detection in spatial join processing," Data Engineering, 2000. Proceedings. 16th International Conference on , vol., No., pp. 535-546, 2000.*

(Continued)

*Primary Examiner* — Jeffrey R Swearingen
*Assistant Examiner* — Taylor Elfervig
(74) *Attorney, Agent, or Firm* — James Bitetto; Joseph Kolodka

(57) ABSTRACT

System(s) and method(s) are provided for data management and data processing. For example, various embodiments may include systems and methods relating to relatively larger groups of data being selected with comparable or better performing selection results (e.g., high data redundancy elimination and/or average chunk size). In various embodiments, the system(s) and method(s) may include, for example a data group, block, or chunk combining technique or/and a data group, block, or chunk splitting technique. Various embodiments may include a first standard or typical data grouping, blocking, or chunking technique and/or data group, block, or chunk combining technique or/and a data group, block, or chunk splitting technique. Exemplary system(s) and method(s) may relate to data hashing and/or data elimination. Embodiments may include a look-ahead buffer and determine whether to emit small chunks or large chunks based on characteristics of underlying data and/or particular application of the invention (e.g., for backup).

11 Claims, 22 Drawing Sheets

OTHER PUBLICATIONS

W.L. Low, M. Lee, and T.W. Ling, "A knowledge-based approach for duplicate elimination in data cleaning", presented at Inf. Syst., 2001, pp. 585-606.*

Dina Bitton and David J. DeWitt. 1983. Duplicate record elimination in large data files. ACM Trans. Database Syst. 8, 2 (Jun. 1983), 255-265.*

Purushottam Kulkarni, Fred Douglis, Jason LaVoie, and John M. Tracey. 2004. Redundancy elimination within large collections of files. In Proceedings of the annual conference on USENIX Annual Technical Conference (ATEC '04). USENIX Association, Berkeley, CA, USA, 5-5, pp. 1-20.*

Calicrates Policroniades-Borraz, "Decomposing File Data into Discernible Items", Technical Report, UCAM-CL-TR-672 ISSN 1476-2986, Computer Laboratory, University of Cambridge, Aug. 2006.

S. Annapureddy, M. Freedman, and D. Mazières, "Shark: Scaling File Servers via Cooperative Caching" in NSDI '05 Paper [NSDI '05 Technical Program], (2005), pp. 129-142, http://www.usenix.org./events/nsdi05/tech/full_papers/annapureddy/annapureddy.pdf.

J. Barreto and P. Ferreira, "A Replicated File System for Resource Constrained Mobile Devices" in Proceedings of IADIS International Conference on Applied Computing, (2004), pp. 1-9.

A. Broder, "Some Application of Rabin's fingerprinting method" in R. Capocelli, A. De Santis and U. Vaccaro (eds), Sequences II: Methods in Communications, Security, and Computer Science, (1993), pp. 1-10 (pp. 143-152 in book).

A.Chowdhury, O. Frieder, D. Grossman, and M. C. McCabe, "Collection Statistics for Fast Duplicate Document Detection" in ACM Trans. Inf. Syst. 20, (2002), ISSN 1046-8188, pp. 171-191 http://www.ir.iit.edu/publications/downloads/p171-chowdhury.pdf.

T. Denehy and W. Hsu, "Duplicate Management for Reference Data", Technical report RJ 10305, IBM Research (2003), pp. 1-14 http://domino.watson.ibm.com/library/cyberdig.nsf/papers/9ADD5F942230D74585256E3500578D88/%24File/rj10305.pdf.

F. Douglis and A. Iyengar, "Application-Specific Delta-encoding via resemblance Detection", in Proceedings of the USENIX Annual Technical Conference (2003), pp. 1-23.

K. Eshghi and H. K. Tang, "A Framework for Analyzing and Improving Content-Based Chunking Algorithms", Technical report HPL-2005-30R1, HP Laboratories (2005), pp. 1-10. http://www.hpl.hp.com/techreports/2005/HPL-2005-30R1.html.

G. Forman, K. Eshghi, and S. Chiocchetti, "Finding Similar Files in Large Document Repositories" in KDD '05: Proceeding of the eleventh ACM SIGKDD international conference on Knowledge discovery in data mining, ACM Press, New York, NY, USA, (2005), pp. 394-400.

V. Henson and R. Henderson, "Guidelines for Using Compare-by-hash", (2005), pp. 1-14.

N. Jain, M. Dahlin, and R. Tewari, "TAPER: Tiered Approach for Eliminating Redundancy in Replica Synchronization", Tech. Rep., Technical Report TR-05-42, Dept. of Comp. Sc., Univ. of Texas at Austin (2005), pp. 1-14, http://www.cs.utexas.edu/department/research/pubs.html.

R. Jain, "A Comparison of Hashing Schemes for Address Lookup in Computer Networks", IEEE Transactions on Communications 40, 1570 (1992), pp. 1-5, http://citeseer.ist.psu.edu/jain92comparison.html.

P. Koopman, "32-Bit Cyclic Redundancy Codes for Internet Applications", (2002), pp. 1-10.

P. Kulkarni, F. Douglis, J. LaVoie, and J. Tracey, "Redundancy Elimination Within Large Collections of Files" in Proceedings of the USENIX Annual Technical Conference (2004), pp. 1-14 http://scholar.google.com/url?sa=U&q=http://www.usenix.org/event/usenix04/tech/general/full_papers/kulkarni/kulkarni_html/.

P. L'Ecuyer, Tables of Linear Congruential Generators of Different Sizes and Good Lattice Structure, in Math. Comput. 68, 249 (1999), ISSN 0025-5718, pp. 249-260 http://portal.acm.org/citation.cfm?id=307102&dl=acm&coll=&CFID=15151515&CFTOKEN=6184618#.

H. Lufei, W. Shi, and L. Zamorano, "On the Effects of Bandwidth Reduction Techniques in Distributed Applications", Proceedings of International Conference on Embedded and Ubiquitous Computing (EUC'04) (2004), pp. 1-10.

A. Muthitacharoen, B. Chen and D. Mazieres, "A Low-bandwidth Network File System", (2001), pp. 174-187.

C. Policroniades and I. Pratt, "Alternatives for Detecting Redundancy in Storage Systems Data", in USENIX_04: Proceedings of the USENIX Annual Technical Conference (2004), pp. 1-14 http://www.usenix.org/events/usenix04/tech/general/full_papers/policroniades/policroniades.html/.

D. R. K. Ports, A. T. Clements, and E. D. Demaine, "PersiFS: A Versioned File System with an Efficient Representation", in SOSP '05: Proceedings of the twentieth ACM symposium on Operating systems principles, ACM Press, New York, NY, USA, (2005), pp. 1-2.

M. Rabin, "Fingerprinting by Random Polynomials" Technical report TR-15-81, Harvard University (2003), pp. 1-12.

S. Schleimer, D. S. Wilkerson, and A. Aiken, "Winnowing: Local Algorithms for Document Fingerprinting", in SIGMOD '03: Proceedings of the 2003 ACM SIGMOD international conference on Management of data, ACM Press, New York, NY, USA, (2003), ISBN1-58113-634-X, pp. 1-10 http://citeseer.ist.psu.edu/schleimer03winnowing.html.

A. Spiridonov, S. Thaker, and S. Patwardhan, "Sharing and Bandwidth Consumption in the Low Bandwidth File System" in Tech. Rep., Department of Computer Science, University of Texas at Austin (2005), pp. 1-20 http://www.cs.utexas.edu/users/sahilt/research/LBFS.pdf.

J. Stone and M. Greenwald, "Performance of Checksums and CRCs over Real Data", (1998), pp. 1-19.

J. Stone, R. Stewart and D. Otis, "Stream Control Transmission Protocol (SCTP) Checksum Change", RFC 3309, The Internet Society, Sep. 2002, pp. 1-17 http://www.faqs.org/ftp/rfc/pdf/rfc3309.txt.pdf.

T. Suel, P. Noel, and D. Trendafilov, "Improved File Synchronization Techniques for Maintaining Large Replicated Collections over Slow Networks" in ICDE '04: Proceedings of the 20th International Conference on Data Engineering, IEEE Computer Society, Washington, DC, USA, (2004), pp. 1-12.

A. Tridgell, "Efficient Algorithms for Sorting and Synchronization", Ph.D. Thesis, Australian National University, (Feb. 1999), pp. 1-115, http://citeseer.ist.psu.edu/tridgell99efficient.html.

A. Tridgell and P. MacKerras, "Technical report TRCS-96-05—The Rsync Algorithm", Australian National University, Department of Computer Science, FEIT, ANU (1996), pp. 1-6 http://eprints.anu.edu.au/archive/00001600/.

L. You and C. Karamanolis, "Evaluation of Efficient Archival Storage Techniques", in Proceedings of $21^{st}$ IEEE/NASA Goddard MSS (2004), pp. 1-6 http://citeseer.ist.psu.edu/697193.html.

L. You, K. T. Pollack, and D. D. E. Long, "Deep Store: An Archival Storage System Architecture" in ICDE '05: Proceedings of the 21st International Conference on Data Engineering, IEEE Computer Society, Washington, DC, USA, (2005), pp. 1-12.

* cited by examiner

METHODS AND SYSTEMS FOR QUICK AND EFFICIENT DATA MANAGEMENT AND/OR PROCESSING

This patent application is related to U.S. patent application Ser. No. 11/566,122, titled METHODS AND SYSTEMS FOR DATA MANAGEMENT USING MULTIPLE SELECTION CRITERIA to Cezary Dubnicki, Erik Kruus, Cristian Ungureanu, and Krzysztof Lichota, also filed on Dec. 1, 2006, which is hereby incorporated herein by reference for all purposes.

This disclosure may contain information subject to copyright protection, for example, various psuedocodes, code, or computer program(s) listed herein. The copyright owner has no objection to the facsimile reproduction by anyone of the patent disclosure or the patent as it appears in the U.S. Patent and Trademark Office files or records, but otherwise reserves all copyright rights whatsoever.

BACKGROUND

1. Field of the Invention

The present invention relates to the field of data processing and data management and, more specifically, to methods and systems related to efficient processing for applications such as data hashing and/or data redundancy elimination.

2. Description of Related Art

Every day more and more information is created throughout the world and the amount of information being retained and transmitted continues to compound at alarming rates, raising serious concerns about data processing and management. Much of this information is created, processed, maintained, transmitted, and stored electronically. The mere magnitude of trying to manage all this data and related data streams and storage is staggering. As a result, a number of systems and methods have been developed to process data more efficiently and to store and transmit less data by eliminating as much duplicate data as possible. For example, various systems and methods have been developed to help reduce the need to store, transmit, etc., duplicate data from the various electronic devices such as computers, computer networks (e.g., LANs, intranets, the Internet, etc.), mobile devices such telephones, PDA's, disk drives, memory chips, etc. Such techniques may be for or include data compression, data encryption, and/or data storage. Further, there is a need to encrypt data using cryptography, particularly during e.g., data transmission. For example, systems and methods have been developed that provide for strong (i.e. cryptographic) hashing, and such methods may be incorporated quite naturally within applications that use data hashing to accomplish data redundancy elimination over insecure communication channels. Systems and methods have been developed that provide for data hashing and/or data redundancy elimination also on secure systems. Duplicate data identification and data redundancy elimination in archival streams is one technique to save storage space. In various electronic data management methods and systems, a number of methodologies have been developed for data hashing and/or to eliminate redundant data from, for example, data storage (e.g., archiving, backup data for email or home directories) and data transmission. These techniques include various data compression (e.g., zip techniques), data hashing, and cryptography methodologies.

Some particular types of hashing may include content chunking which may include whole file hashing, fixed-size chunking (blocking), and content-defined chunking. Some exemplary techniques for data stream management and data processing are disclosed in various articles including C. Policroniades and I. Pratt, Alternatives for Detecting Redundancy in Storage Systems Data, in USENIX_04: Proceedings of the USENIX Annual Technical Conference (2004), pp. 1-14; R. Jain, A Comparison of Hashing Schemes for Address Lookup in Computer Networks, IEEE Transactions on Communications 40, 1570 (1992), pp. 1-5; N. Jain, M. Dahlin, and R. Tewari, TAPER: Tiered Approach for Eliminating Redundancy in Replica Synchronization, Tech. Rep., Technical Report TR-05-42, Dept. of Comp. Sc., Univ. of Texas at Austin (2005), pp. 1-14; A. Chowdhury, O. Frieder, D. Grossman, and M. C. McCabe, Collection Statistics for Fast Duplicate Document Detection, ACM Trans. Inf. Syst. 20, (2002), ISSN 1046-8188, pp. 171-191; F. Douglis and A. Iyengar, Application-Specific Delta-encoding via resemblance Detection, Proceedings of the USENIX Annual Technical Conference (2003), pp. 1-23; P. Kulkami, F. Douglis, J. LaVoie, and J. Tracey, Redundancy Elimination Within Large Collections of Files, Proceedings of the USENIX Annual Technical Conference (2004), pp. 1-14; J. Barreto and P. Ferreira, A Replicated File System for Resource Constrained Mobile Devices, Proceedings of IADIS International Conference on Applied Computing, (2004), pp. 1-9; T. Denehy and W. Hsu, Duplicate Management for Reference Data, Technical report RJ 10305, IBM Research (2003), pp. 1-14; G. Forman, K. Eshghi, and S. Chiocchetti, Finding Similar Files in Large Document Repositories, KDD '05: Proceeding of the eleventh ACM SIGKDD international conference on Knowledge discovery in data mining, ACM Press, New York, N.Y., USA, (2005), pp. 394-400; L. You, K. T. Pollack, and D. D. E. Long, Deep Store: An Archival Storage System Architecture, ICDE '05: Proceedings of the 21st International Conference on Data Engineering, IEEE Computer Society, Washington, D.C., USA, (2005), pp. 1-12; K. Eshghi and H. K. Tang, A Framework for Analyzing and Improving Content-Based Chunking Algorithms, Technical report HPL-2005-30R1, HP Laboratories (2005), pp. 1-10; P. L'Ecuyer, "Tables of Linear Congruential Generators of Different Sizes and Good Lattice Structure, in Math. Comput. 68, 249 (1999), ISSN 0025-5718, pp. 249-260; A. Tridgell and P. MacKerras, "Technical report TRCS-96-05—The Rsync Algorithm", Australian National University, Department of Computer Science, FEIT, ANU (1996), pp. 1-6; and L. You and C. Karamanolis, "Evaluation of Efficient Archival Storage Techniques", in Proceedings of $21^{st}$ IEEE/NASA Goddard MSS (2004), pp. 1-6. There are also a number of U.S. patents and patent publications that disclosed various related exemplary techniques, including U.S. Patent Pub. Nos. 2006/0112264, 2006/0047855, and 2005/0131939 and U.S. Pat. Nos. 6,658,423, and 6,810,398. These references indicate various exemplary techniques related to more efficient data processing and data management.

Various references noted above provide an introduction to options such as gzip, delta-encoding, fixed-size blocking, variable-size chunking, comparison of chunking and delta-encoding (delta-encoding may be a good technique for things like log files and email which are characterized by frequent small changes), and comparisons of fixed- and variable-sized chunking for real data.

However, the known techniques lack certain useful capabilities. Typically highly versatile data compression or hashing techniques tend to work better on some data types than on others (e.g., short data blocks vs. long data blocks), for particular applications better than others (e.g., compression rather than data storage or backup), and at different data processing speeds and with different scaling properties with respect to the size of data to be processed. Further, various hardware and application software have an effect on how well a data processing or data management technique may work. For example, as noted below, there are some data compression or redundancy elimination techniques that work very well on short blocks of data (e.g., 32k size blocks), or perhaps medium size data blocks, but not well on large (e.g. Gb size) data blocks.

Unfortunately, the known techniques typically do not adequately consider the data patterns for particular uses, applications or hardware, nor do they efficiently manage the size of data segments during processing while identifying a high degree of the actual data redundancies in a data set or data stream. Known approaches to duplicate elimination have difficulty increasing the average size of stored or transmitted data segments without severely impacting, the degree of duplicate elimination achieved, the time required, and/or the scalability of the approach.

Therefore, there is a need for a data processing and management technique that has reasonable performance and is particularly efficient when being used with archive data, backup data and/or data that is more efficiently transmitted or stored in large blocks or chunks, while achieving a high degree of redundancy elimination. Performance goals for duplicate elimination may include speed, a combination of large average chunk size and a large amount of duplicate elimination, and/or scalability to extremely large datasets.

SUMMARY

The present invention is directed generally to providing systems and methods for data management and data processing. For example, various embodiments may include systems and methods relating to relatively larger groups of data being selected with comparable or better performing selection results (e.g., high data redundancy elimination). In various embodiments, the system(s) and method(s) may include, for example a data group, block, or chunk combining technique or/and a data group, block, or chunk splitting technique. Various embodiments may include a first standard or typical data grouping, blocking, or chunking technique and/or data group, block, or chunk combining technique or/and a data group, block, or chunk splitting technique. Embodiments may include a look ahead buffer and determine whether to emit small chunks or large chunks based on the characteristics of underlying data and/or a particular application of the invention (e.g., for backup). Further, exemplary system(s) and method(s) may relate to a data hashing and/or data redundancy identification and elimination technique for a data set or a string of data. The invention may be a computer implemented invention that includes software and hardware for improving data processing efficiently without notably reducing the quality of the data processing results.

In at least one embodiment, various means to optimize content-defined chunking techniques, functions or methods may be provided for archive or backup data streams or data sets. Various embodiments may include means to accelerate the chunking process using multiple selection criteria (as described in the related patent application noted above). Various embodiments may also include a way to use backup cut points, break points, or chunk points and cutting levels, break levels or chunk levels to maximize the likelihood of generating reproducible cut points, block points, or chunk points, given minimum and maximum allowable output data group, block, or chunk lengths. The various embodiments may be based upon an intuitive model of duplication patterns in some types of archive or backup data. Various embodiments may include an amalgamation of data group(s), block(s), or chunk(s) so as to re-distribute the data group(s), block(s), or chunk(s) to determine improved cut points, block points, or chunk point according to different parameters and/or lengths. Such embodiments may be able to increase the duplicate elimination ratio (DER) and by judicious heuristics not severely decrease the average chunk size. In various embodiments, real-time system(s) and method(s) may be provided which may be able to increase the average chunk size without severely decreasing the duplicate elimination ratio (DER).

These system(s) and method(s) may include splitting or breaking apart data groups and may involve optimistically chunking long sequences of "new" data with large average chunk size, and using smaller chunks for "new" data sufficiently close to what may be duplicate data. In this way some types of backup data may be more easily bracket insertions or deletion regions that may correspond to localized changes. To do this may require a very limited look-ahead, use of a look-ahead buffer, and/or a bounded number of queries per unit of input to determine whether or not a prospective chunk has previously been emitted. The queries may be done exactly or directly, to a backend storage unit, and/or to a local history of limited size maintained in real or virtual memory such as, for example, a Bloom filter.

Various embodiments of the present invention have demonstrated the ability to increase average data group, block or chunk size and duplicate elimination ratio. Further, various embodiments have been able to achieve equivalent duplicate elimination ratio using data groups, data blocks, or data chunks, that are approximately 2-to-4 times larger than previously obtainable. These larger data groups, blocks, or chunks may provide a reduction in the metadata cost of storing data and may result in increased throughput when transmitting data and/or reading or writing to another device, for example, a backup appliance (e.g., a disk or network storage system).

Still further aspects included for various embodiments will be apparent to one skilled in the art based on the study of the following disclosure and the accompanying drawings thereto.

BRIEF DESCRIPTION OF THE DRAWINGS

The utility, objects, features and advantages of the invention will be readily appreciated and understood from consideration of the following detailed description of the embodiments of this invention, when taken with the accompanying drawings, and.

DETAILED DESCRIPTION

Figure 1:
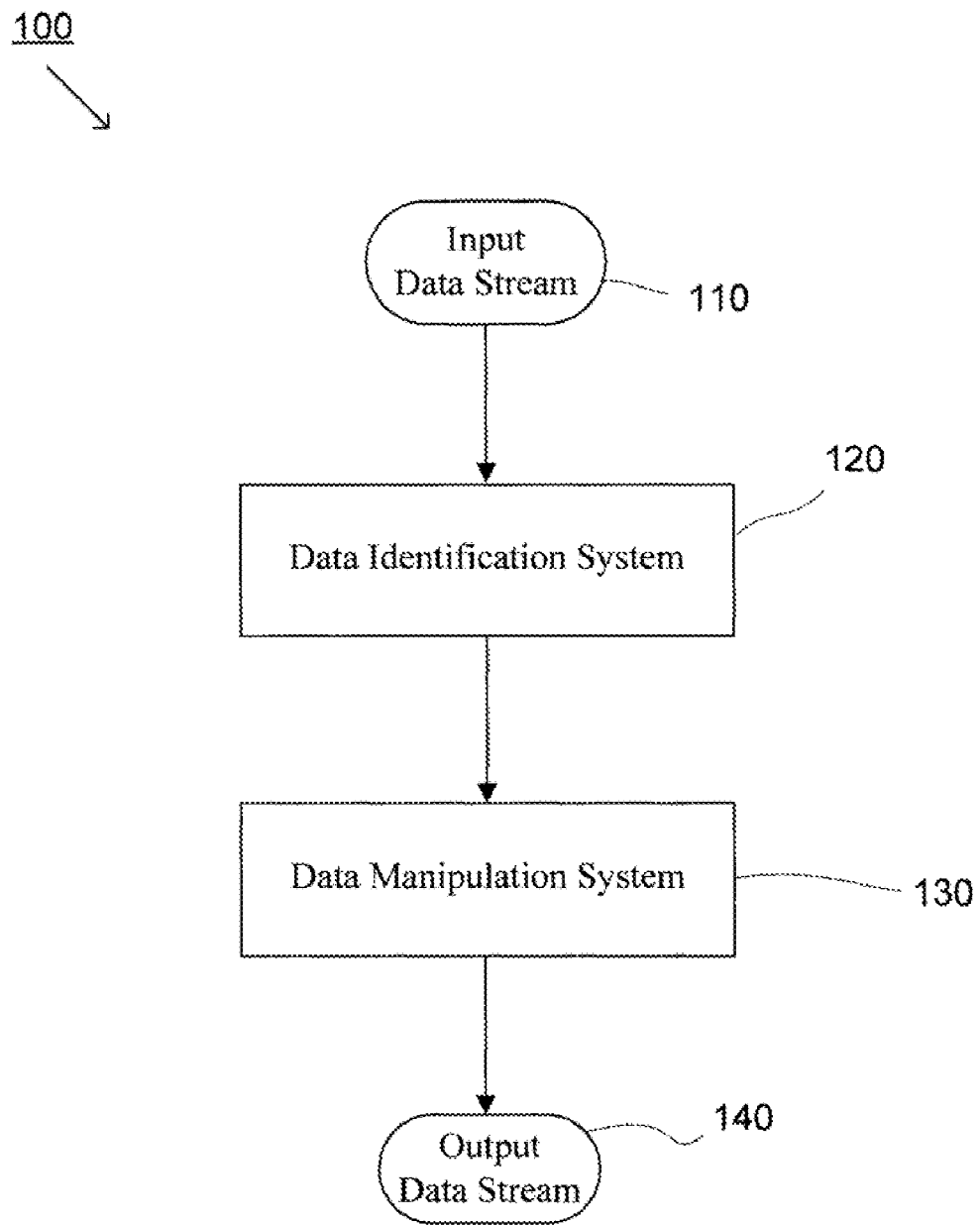
FIG. 1 is an exemplary overview of a data management system that identifies information in an input stream and may at times modify that information before producing output, according to at least one embodiment.

System(s) and method(s) for improved data management and data processing are provided herein. For example, various embodiments of the present invention may include systems and methods relating to relatively larger groups of data being selected with acceptable, comparable and/or better performing selection and/or redundancy elimination results (e.g., high data redundancy elimination). In various embodiments, the system(s) and method(s) may include, for example a data group, block, or chunk combining technique or/and a data group, block, or chunk splitting technique. The invention may be applicable for various types of data processing, data transmission, and/or data storage, and may be particularly useful applications of the invention may included, for example, network file systems of several types, space-optimized archival of collections of reference files, as well as file synchronization, backup data storage, etc. Various embodiments below will provide examples for using the invention with backup data storage, as one particular exemplary application. The invention may be a computer implemented invention that includes software and hardware for improving data processing and data maintenance more efficiently, and may not notably reduce the performance of the data processing results. The computer implementation may include various electronic devices (e.g., PDAs, cellular telephones, GPS, etc.), computers (e.g., PC), storage devices or systems, and/or computer networks (LAN, Intranet, Internet, etc.), as will be described in more detail below.

Typically compression algorithms are geared to characteristics of short blocks of data. For example, when viewed as bytes or English words, a context-free-grammar will typically find fewer and fewer productions involving sequences of long length. Reasonable compression may be achieved by mechanisms involving a local data model or dictionary-based lookup techniques. For example, gzip operates on short (e.g. 32k) blocks, replacing repeating strings with a pointer of form (distance, length). In this case gzip achieves redundancy elimination at a local scope, and does this using redundant strings whose length can be quite small.

In archival data, the situation may be quite different. On real file systems most file accesses are read-only, files tend to be either read-mostly or write-mostly, and a small set of files generates most block overwrites. Entire files may be duplicated, and even when changed, the changes may be localized to a relatively small edit region. Here, a compression scheme must deal effectively with long repeated data segments. Even more constraining, the 'future' during which the data reoccurs may be gigabytes ahead (i.e. the next backup run). In this case, duplicate identification and redundancy elimination at a global scope, over a much larger input data region, may be targeted. Because of the additional overhead associated with storing the 'location' of these redundant strings, the chunks of interest are much larger than those targeted by, for example, data compression techniques like gzip.

Because the fundamental assumption for archival data is so different, dictionary-based compression techniques may use the procedure referred to as duplicate elimination (DE). In duplication elimination, one simply breaks apart an input data stream reproducibly, and then stores (or transmits) only one copy of any chunks that duplicate a previously emitted chunk.

Duplicate elimination may be distinguished from more aggressive techniques that do considerable additional work to improve compressibility. An often used technique in more aggressive compression schemes is to invoke resemblance detection and some form of delta encoding. Unfortunately, finding maximally-long duplicates or finding similar (or identical) files in large (gigabyte) collections is a very involved nontrivial task that typically includes specialized algorithms (see, e.g., U.S. Pat. No. 6,658,423).

Various embodiments may include a data grouping, blocking, or chunking technique and/or data group, block, or chunk combining technique, or/and a data group, block, or chunk splitting technique. In various embodiments the data grouping, blocking, or chunking technique may utilize a standard or typical data grouping, blocking, or chunking approach. Embodiments may include a look ahead buffer and determine whether to emit small chunks or large chunks based on the characteristics of underlying data and/or a particular application of the invention (e.g., for backup). Further, exemplary system(s) and method(s) may relate to a data hashing and/or data redundancy identification and elimination technique for a data set or a string of data. In some exemplary embodiments, the present invention will be described as applied to data archiving and/or data backup and will be configured to perform particularly well in that application.

In at least one embodiment, various means to optimize content-defined chunking techniques, functions or methods may be provided for archive or backup data streams or data sets. Various embodiments may include means to accelerate the chunking process using multiple selection criteria (e.g., as described in the related patent application noted above). Various embodiments may also include a way to use backup cut points, break points, or chunk points and cutting levels, break levels or chunk levels to maximize the likelihood of generating reproducible cut points, block points, or chunk points, given minimum and maximum allowable output data group, block, or chunk lengths. Such cut, block or chunk points may be generated in a manner expected to have good duplicate detection ability. The various embodiments may be based upon an intuitive, measured, and/or dynamic model of duplication patterns that may occur in some types of archive or backup data.

In various embodiments, real-time data processing and/or data management system(s) and method(s) may be provided which may be able to increase the average chunk size without severely decreasing the duplicate elimination ratio (DER). When considering applying the present invention to archive or backup data, one assumption for fresh or new data may be that it has a high likelihood of reoccurring in a future backup run. In that case, using large data groups, blocks or chunks may prove most efficient. Thus, the system(s) and method(s) of the present invention may involve optimistically chunking long sequences of fresh or "new" data with large average chunk(s). This may be combined with the use of smaller chunks for "new" data sufficiently close to what may be duplicate data. In this way some types of backup data may be more easily bracket insertions or deletion regions that may correspond to localized changes. To do this may require a very limited look-ahead and use of a look-ahead buffer, and a bounded number of queries per unit of input to determine whether or not a prospective chunk has previously been emitted. The queries may be done exactly or immediately, to a backend storage unit, or to a local history of limited size real or maintained in real or virtual memory, for example, a Bloom filter. Various embodiments of the present invention have demonstrated the ability to increase average data group, block or chunk size and maintain an acceptable (or even improved) duplicate elimination ratio. Further, various embodiments have been able to achieve approximately equivalent duplicate elimination ratio using data groups, data blocks, or data chunks, that are approximately 2-to-4 times larger than previously obtainable. These larger data groups, blocks, or chunks may provide a reduction in the metadata cost of storing data and may result in increased throughput when transmitting data and/or reading or writing to another device, for example, a backup appliance (e.g., a disk storage system).

The present invention may be a computer implemented invention that includes software and hardware for improving data processing efficiency without notably reducing the quality of the data processing results. In at least one embodiment, the system(s) and method(s) provided herein may be implemented using a computing device, and may be operational on one or more computer(s) within a network. Details of exemplary computing device(s) and network(s) are described in some detail later herein with reference to FIG. 19 and FIG. 20. Prior reference to those examples may prove helpful in developing a better appreciation for various details of the present invention.

In any case, for ease of understanding, the present invention will be explained in more detail for use with hashing functions and/or data redundancy identification and/or data duplication elimination. However, one skilled in the art would appreciate that the present invention may be applicable to other data management and processing systems and methods including computers with a string of data to process or store, wireless communications that have data to transmit, Internet and intranet applications, data encryption techniques, etc. In particular, the exemplary embodiments used herein to explain the present invention relate primarily to data hashing and data duplication elimination.

In the case of whole file hashing, hashing may be performed by applying a hashing function to all the data of entire files. For example, a SHA-1 hashing function might be used and applied to an entire data file. The SHA-1 hashing function is computationally complex and may be slow relative to some other hashing functions. Regardless, in this case, for purposes of identifying and eliminating duplication, the least amount of data duplication is found and eliminated because when a single bit of data changes in a file, the resulting hash value will be different than previously saved and the full amount of data associate with the revised file will need to be transmitted or saved (e.g., when one letter in a text file is changed, the entire data representation of the text file and it's hash value will change so that it will not be a duplicate of a previous version of the same text file). On the other hand the hashing is quick because the hashing function need only be operated once for an entire file of data.

A fixed size data block hashing function may perform hashing on portions or blocks of the entire data found in a whole file (e.g., a single text file may be broken up into 10 same sized data blocks of 10K bits), and data blocks may be set at a non-overlapping fixed size. For various purposes, the speed of blocking or chunking is attractive. The simplest and fastest approach is to break apart the input stream into fixed-size chunks. This approach may be taken in some rsync file synchronization techniques. However, there is a potential resynchronization problem when using fixed-size chunking; consider what happens when an insertion or deletion edit is made near the beginning of a file: after a single chunk is changed, the entire subsequent chunking will be changed. A new version of a file will likely have very few duplicate chunks. Once again, for fixed size blocks, a SHA-1 hashing function might be applied to each of a fixed size set of blocks (e.g., 10K bits) that make up a whole file (e.g., 100K bits). In this case, more duplication may be found because the block of data hashed each time is smaller, and a single bit change somewhere in a whole file will only result in a change in one of the multiple blocks that make up a whole file (e.g., 9 of the 10 10K bit blocks will be duplicates). The smaller the block, the better redundancy detection, but a slightly slower process may result because the hashing function, for example SHA-1, must be run more times for the same amount of data found in the whole data file.

One way to circumvent the resynchronization problem is by using content-defined chunking (CDC) techniques; in which a local window (e.g., 12-48 bytes long) may be used to reproducibly separate the data stream into variable-size chunks. Such chunking is probabilistic in the sense one has some control over the average output chunk size, or the average rate of chunk production, given random data input. CDC produces chunks of variable size that are better able to restrain changes from a localized edit to a limited number of chunks. Applications of CDC may include network file systems of several types, space-optimized archival of collections of reference files, and file synchronization. The Low-Bandwidth File System (LBFS) was influential in establishing CDC as a widely used technique. Usually, the basic chunking algorithm is typically only augmented with limits on the minimum and maximum chunk size. In some cases, a more complex decision can be made if one reaches the maximum chunk size or if auxiliary special data sequences are found within the input data stream.

The content defined data chunk hashing may be performed by applying a fairly slow and somewhat better performing (e.g., more accurate and discriminating) calculation to identify and generate a value for various chunks of data that are defined by their content. One such hashing function may include a combination of Rabin fingerprinting and SHA-1 hashing function. The Rabin fingerprinting may be applied multiple times for overlapping data windows (e.g., sliding window) of the data in the data file to determine where in a data file the chunk boundaries should be set, based on a predetermined boundary point criteria (e.g., a predetermined set of bits in the fingerprint being 0's), then the SHA-1 hashing function may be applied to each of the determined data blocks (whose size varies based on the underlying data being analyzed). Again, each byte of input may enter into some SHA-1 hash calculation, as noted before. However, the Rabin fingerprinting presents an additional calculation burden (e.g. processing time) when compared to fixed size chunking. Although this approach is very good at identifying many more data redundancies, both of these functions can be time consuming and in combination may make hashing and/or data redundancy identification and elimination very time consuming. In fact, the Rabin fingerprinting function may be particularly time consuming for identifying where in particular the various data block cut or hash point should be in attempting to optimize the redundancy data identification and/or data elimination.

In various embodiments related to data archival or backup, a prioritized hierarchy of backup cut points, chunk points, or break points, may be used when the maximum block or chunk size is reached by using a basic chunking technique. This technique may be motivated by a desire to increase the likelihood of being able to resynchronize an input stream containing localized edits. The technique may be augmented by a chunk combining or amalgamation technique or a chunk splitting or breaking technique. It will be illustrated herein that such an approach may be used effectively with notable improvement over prior system(s) and method(s), by considering the statistics of chunking a random data input. The basic chunking technique may operate using a content-defined chunking scheme parameterized by minimum and maximum chunk lengths, and may possibly including a notion of backup cut points, chunk points, or break points, and may be referred to herein as the "baseline" duplicate elimination technique or function.

One benefit of duplicate elimination (DE) is that for many file system-like inputs most of the reproduced content may be recognized. Compared with actively searching for duplicate region(s) that are optimal in some compression-related sense, inefficiency in duplicate elimination primarily occurs at data groups, blocks or chunks that straddle boundaries between new and old data. So as data group, block, or chunk size is reduced, generally the efficiency of duplicate-elimination increases. However this may result in an increase in per-chunk (group or block) storage costs (more metadata, longer retrieval and re-assembly time, etc.).

Duplicate elimination ratio (DER) may be defined as the ratio of bytes input/bytes stored (i.e., data input/data stored using bytes as the unit of data). Considering data archival applications, current data archival systems may obtain DER of approximately 5 to 20. One consideration is how the per-chunk metadata may affect the desired data group, block or chunk sizes for DE purposes. Suppose, for example, that one has an overhead of 100 bytes per data group, block, or chunk to indicate where and how the data group, block or chunk may be stored. If such a system is to support a maximum DER of, for example, 50, then the average data group, block or chunk size should be at least 50*100=5000 bytes (at this data group, block, or chunk size, adding one duplicate still costs you 100 bytes).

If per-chunk costs are high, there may be an incentive to produce larger data group, block, or chunk size. For this reason, typical duplicate elimination approaches use data group, block or chunk sizes in the range of, for example, 2k-16k, and explicitly do not attempt to remove redundancy at the short-string level. Such redundancy may be removed to a limited degree by using a fast "local" compression scheme on individual chunks. Once again, the efficiency of per-chunk (group or block) compression may rise if data groups, blocks, or chunks of larger average size may be used. It is worth noting however, that this particular benefit is still somewhat minor compared to the amount of data storage space saved by duplicate elimination, because it occurs only once per stored chunk, while the gain due to duplicate elimination occurs every time the chunk is encountered, which may be 5-20 times for typically data.

One objective of the present invention may be to find an improved duplicate elimination scheme that may increase DER and/or average data group, block, or chunk size relative to traditional ("baseline") duplicate elimination approaches. Various types of applications of the present invention may require developing the particular functions of the invention according to unique aspects or characteristics of the data set or data stream for that application. For example, two primary principles may be applied to making improvements to processing and managing streams of archive or backup data: Principle 1—Long stretches of new or previously unseen data may be assumed to be good candidates to appear later on (e.g., at the next backup run); and Principle 2—Inefficiency that occur around "change regions" straddling boundaries between duplicate and new (previously unseen) data may be minimized by shorter chunks. In this case, Principle 1 may be justified by the fact that the DER for archival or backup data often lies in the range of 5-20 for "typical" archive or backup data (e.g., home directories, e-mail, etc.). On the other hand, Principle 1 may in fact be unjustified for systems with a high rollover of content, or content data streams with frequent non-duplicate markers inserted. Principle 1 supports using a data grouping, blocking, or chunking technique or procedure that may produce data groups, blocks, or chunks having large average size, particularly when in an extended region of new or previously unseen data.

From Principle 2 may arise many variants of the baseline technique or procedure: variants that differ primarily in how the change regions are identified, and how much of the new or previously unseen data within a change region is grouped, blocked, or chunked at finer granularity. One approach may be to begin with an initial technique that may first group, block or chunk everything into data groups, blocks or chunks containing large amounts of data on average. Subsequently, blocks containing duplicate and non-duplicate data may be identified, and a subset of these blocks selected. This selected subset may then use a breaking-apart or splitting apart technique to re-chunk the identified regions of data at a finer level. One advantage of this approach may be that few queries for duplicate chunks may be required. However, in such an approach, a small insertion/modification may invalidate an entire large chunk. If duplicate elimination ratio (DER) performance is more important than minimizing the number of queries, the amalgamation procedure discussed in the next paragraph may be a better choice. By offering more flexibility in where big chunks can be situated, a somewhat better DER may be obtainable.

In what may be a slightly more flexible approach, data building-up or amalgamation techniques or procedures that may initially chunk at a fine level, and combine small chunks into larger ones may be preferable. Such an approach may be more flexible by allowing an increased number of possibilities for how to form large chunks. The building-up or amalgamation grouping, blocking, or chunking technique may more finely bracket, and later reutilize, a single inserted/modified chunk. However, as noted above, providing more variations or possibilities for how to construct big data groups, blocks, or chunks may cost an increased number of queries to determine whether different prospective big size groups, blocks, or chunks may be duplicates or not. Several variants may differ by restricting the number of queries required before making a data grouping, blocking or chunking decision.

In general, the more flexibility available for creating bigger data groups, blocks, or chunks (e.g., greater amount of data per data group, block, or chunk) and in bracketing change regions, the better the techniques' or procedures' performance may be in terms of simultaneously increasing DER and data group, block or chunk size. The exact behavior of these techniques, in for example a data archival setting, may depend on the distribution of frequency, length of duplicate regions, and the average size of insertion or modification "edits" from one backup sequence or session to the next backup sequence or session.

Various embodiments of the present invention may be both fast and scalable, particularly with respect to embodiments involving the amount of data or number of files to be stored. If these requirements are relaxed, various data blocking techniques of the present invention may be coupled with more complicated approaches. For example, various embodiments may also include storing information as to what particular sub-chunks a large chunk contains, and producing more complicated compression style recipes for storing and reconstituting a data stream. Further, the present data grouping, blocking, and chunking techniques or functions may be coupled with more ambitious techniques such as resemblance detection and delta compression. However, various approaches based on actively finding "similar" files or chunks may be less versatile because they tend to scale linearly or worse with the number of stored chunks. The better approach may be to use somewhat "passive" techniques, governed mainly by the simple Principle 1 and Principle 2 noted above, that may operate in constant time, since they may require only a bounded number of data group, block, or chunk existence queries to make the final data grouping, blocking or chunking decision. For use with data archive and backup applications, the present invention may use, for example, a target of 32k average data group, block or chunk size. This target may be useful for obtaining desirable levels of a combination of read/write speed requirements and metadata storage costs (larger chunks aid these goals). However, it may also be desirable to achieve DE levels comparable with existing duplicate elimination schemes that typically use chunk sizes averaging only 4k-8k.

The present invention may include a multiple selection criteria technique for rolling window cut point, break point, or chunk point selection. Content-defined chunking generally operates by selecting a predetermined set of locations to break apart an input stream. The chunking is content-defined if the chunking decision (cut point determination) is based upon the data contained within a local window. The typical objective is that if the set of windows that produce cut points is sufficiently random, then for real data inputs the chunk size distribution will still resemble statistical expectations for random input. To achieve both fast cut point determination and reasonably good performing cut points (as noted in related patent application titled METHODS AND SYSTEMS FOR DATA MANAGEMENT USING MULTIPLE SELECTION CRITERIA to Cezary Dubnicki, Erik Kruus, Cristian Ungureanu, and Krzysztof Lichota, filed the same day herewith, hereby incorporated herein by reference), a first fast selection function, e.g., a boxcar sum, and a second slower selection process, e.g., CRC32c or SHA-1, may be used to determine the initial set of cut points.

The two-stage cut, break or block point selection process may be selected to leverage the speed of the boxcar sum. First, a rather permissive selection may be done using a fast boxcar sum to produce a set of potential cut, break or block points. From this set, a second (slower) hash function may be use to select the final cut, break, or block points. These "combined" chunking functions operate at the speed of the boxcar hash (typically memory bandwidth-limited) for most of the input windows, and only occasionally need to be evaluated with the slower hash function. Since the second hash function need not be rolled, any hash function may be used with little impact on the speed. In various embodiments, it may be beneficial to combined the faster boxcar function (e.g., hash function) for an initial selection and follow it with a slower CRC32c or SHA-1 function (e.g., hash function) for the final selection. Possible chunking cut, block, hash, or break points may be determined by consulting the number of least significant zero bits of the hash value. If this number of zero bits was l, then we will say this window generates a cut point at level l. A table of various exemplary cut, break, hash, block point functions is illustrated in Table 1 showing various speeds achieve during simulation.

TABLE I

| name | code | speed MB/s |
|---|---|---|
| boxcar | hash += b | 360 |
| rolN-xor | hash = ROL(hash, N) ^ b | 280 |
| MLCG | hash = hash * A + b | 270 |
| Rabin | hash = ((hash<<8)lb) ^ A[hash>>N ] | 195 |
| xor | hash = A[b] | 175 |
| rolN-xor[ ] | hash = ROL(hash, N) ^ A[b] | 175 |
| xAdler | s1 +=b; s2 +=s1 ; hash=s1 ^ s2 ; hash =hash>>6; | 160 |

Some simple Hash Functions are provided above in Table I. Hash is assigned a constant initial value. For each byte in the window, hash is modified by adding the next byte value b. The hash functions listed here have fast rolling versions. Here A and N are hash-specific constants and ROL is a rotate-left operation. The xAdler hash is a simplified version of the Adler(/Fletcher) hash. Speed values are representative of fairly optimized code with a maximal amount of compile-time constants, and may provide a reasonable indication of the hash function speed. The speed tests measure rolling the hash and checking for terminal zero bits on several hundred megabytes of in-memory random data.

In various embodiments, the system(s) and method(s) may include generating and maintaining multiple backup cut, block, hash, or break points. The parameters commonly set for any rolling hash algorithm may be: the minimum chunk size, m; the maximum chunk size, M; the chunking 'level' l; and the number of backup cut points b. For random input data, any window checksum that cuts at level P should generate an average chunk size of $\bar{L}=2^l$. The expected average data chunk size is the statistically expected rate of selecting chunking boundaries when presented with an input stream containing random input data. The statistical expectation for chunk size s should follow an exponential distribution with average value $\overline{L}$:

$$P(s) = \frac{e^{-s/\overline{L}}}{\overline{L}} \quad (1)$$

In any sequence of S input bytes, the probability of seeing exactly k cut points should follow a Poisson distribution:

$$P(S, k) = \frac{(S/\overline{L})^k e^{-s/\overline{L}}}{k!} \quad (2)$$

The probability of having exactly one cut point (k=1) within region S is maximized when S=$\overline{L}$. For minimum chunk size m, the average chunk size should be around m+$\overline{L}$. For a maximum chunk size M, a plain level P chunker will hit the maximum with probability $e^{-(M-m)/\overline{L}}$. The exponential distribution has a rather long tail. If the function is operating in a regime where ($\overline{L} \equiv 2^l$)≈(S≡M−m), then it may produce a maximally-sized chunk $e^{-1}$~37% of the time. This is a rather large fraction of chunks, and an alternative cutpoint could be selected in this case. An easily maintainable alternate is any cutpoints that may be encountered at level l−1
(and so on). At this first backup level, with an average chunk size $$m + 2^{l-1} \sim m + \frac{M-m}{2},$$

we are less likely (≈10%) to have zero cutpoints. If there is a cutpoint at this level, it clearly will afford a better opportunity to, for example, resynchronize two input streams than an arbitrary cut at the $M^{th}$ data byte. By maintaining a few backup levels for cut points, the probability of having no unique cut point may be decreased. Often 3 backup cut points are used in the various experiments described herein and may be a practical selection. Having several backup cut, block, hash, break points at one level, may enable choosing to cut at the earliest or the latest such point. For duplicate elimination purposes, cutting at the earliest cut point may typically provide the best resynchronization. Cutting at a later cut point may provide the largest increase in chunk size, at the expense of increasing the slack (see, e.g., U.S. Patent Publication No. 2006/0047855). In various experimental data presented herein, the backup cuts, blocks or hash points may be selected to yield the longest and largest block or chunk. A more detailed discussion of various embodiments of the present invention will now be provided with reference to the figures.

FIG. 1 provides an exemplary overview of a data management system 100 that may identify information in an input stream and may at times modify that information before producing output, according to at least one embodiment of the present invention. An input data stream 110 may be provided. The input data stream 110 may be a data stream or data set and may be comprised of, for example, one or more electronic bits and/or bytes of data. The data stream 110 may come from one or more of any number or kinds of equipment or sources (e.g., computer programs operating on a PC, a LAN, the Internet, a storage disk, a wireless hand held device, a microprocessor output, a memory chip, a memory stick, a received transmission, etc.). A data identification system 120 may identify the various bits and/or bytes of electronic information and may store them in various memories, buffers, etc., for use (which may be included in one or more electronic devices). The data identification system may also include various break, block, chunk, or hash point determination functions. This data and information may be used by a data manipulation system 130. In various embodiments, the data manipulation system 130 may include a data hash function, a duplicate elimination function, a hash table, a compression function, etc., and may be included in an electronic and/or computer system or network. Although, data from the data stream 110, may or may not at times be manipulated, based upon the type and characteristics of the data and the purpose or application of the data manipulation system 130. In any case, once the data has been through the data identification system 120 and the data manipulation system 130, some or all of it may be output as an output data stream 140. This output data stream may subsequently be further processed, transmitted, stored, etc. in any manner typically experience by electronic data. In various embodiments of the present invention, the output data stream may be archived or stored as backup data on any of a number of storage mediums.

Figure 2:
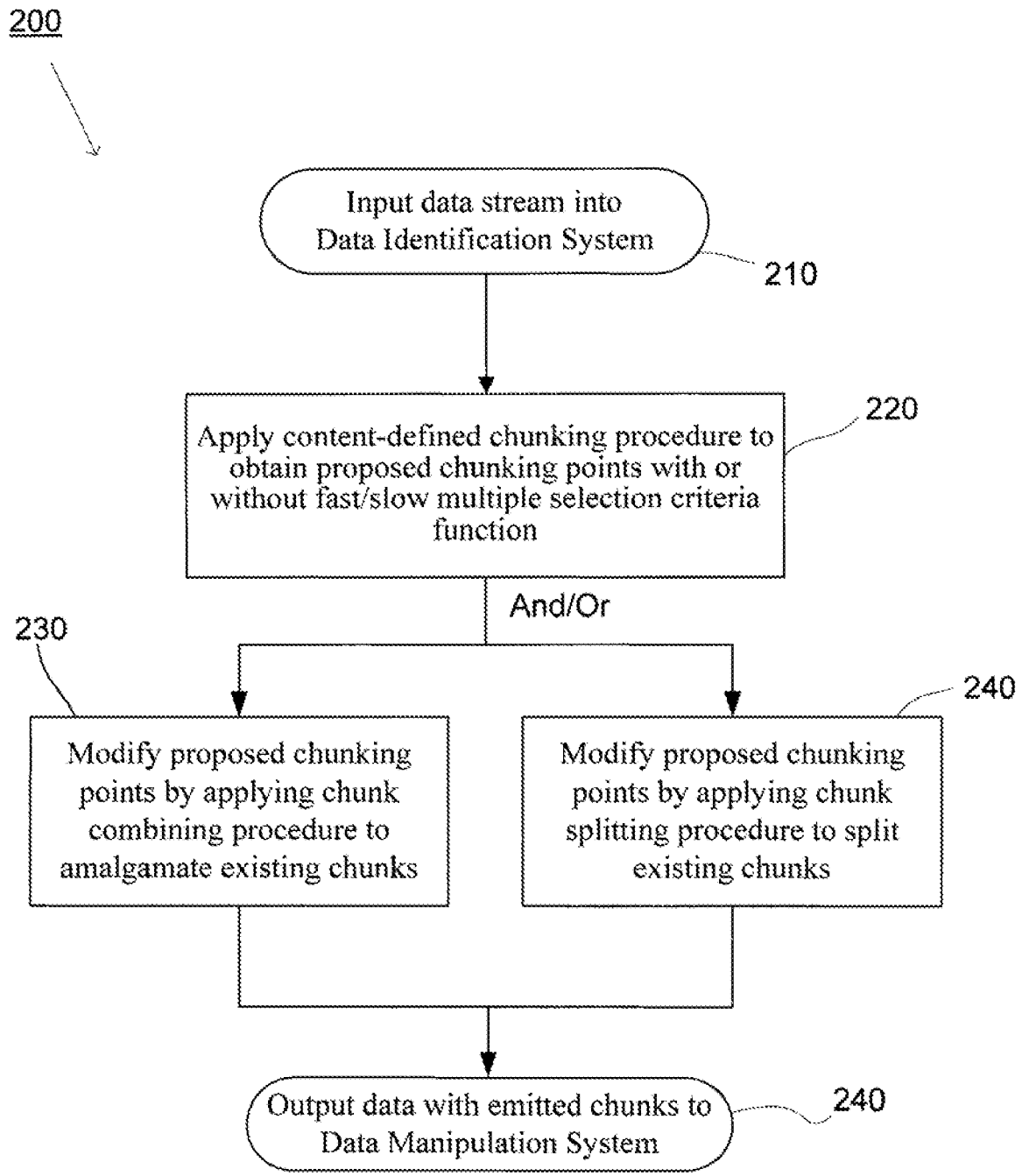
FIG. 2 is an exemplary overview of a data identification process utilizing a first selection function and then utilizing a second modifying selection function which consists of a content-defined chunking policy that may amalgamate and/or break apart certain existing chunks, according to at least one embodiment.

Referring now to FIG. 2, an exemplary overview of a data identification process 200 is provided. The data identification process 200 may utilizing, for example, a first selection function 220 (may include a fast/slow multiple selection criteria described above) and then may utilize a second modifying selection function which may consists of a content-defined chunking policy that amalgamates 230 and/or breaks apart 240 certain existing chunks. The process may begin at step 210, in which an input data stream is input into a data identification system (e.g., system 120). Next, at step 220, a content-defined chunking procedure (function, algorithm, etc.) may be applied to the data stream to obtain proposed data cut, block, break, or chunk points. The content defined chunking procedure may include a first fast hash and a second slow hash function or procedure (e.g., to the technique disclosed in the aforementioned related patent application). Next, one or both of steps 230 or 240 may be performed. At step 230, the proposed data cut, block, break, or chunk points may be modified by applying a block or chunk combining procedure to amalgamate existing chunks based on particular rules that will be described in more detail below. At step 240, the proposed data cut, block, break, or chunk points may be modified by applying a block or chunk splitting or breaking-apart procedure to split existing chunks into smaller chunks based on particular rules that will be described in more detail below. At step 240, the output data from these procedures may determined the cut, block, break or chunk points or emitted chunks to be sent to a data manipulation system 130.

Figure 3A:
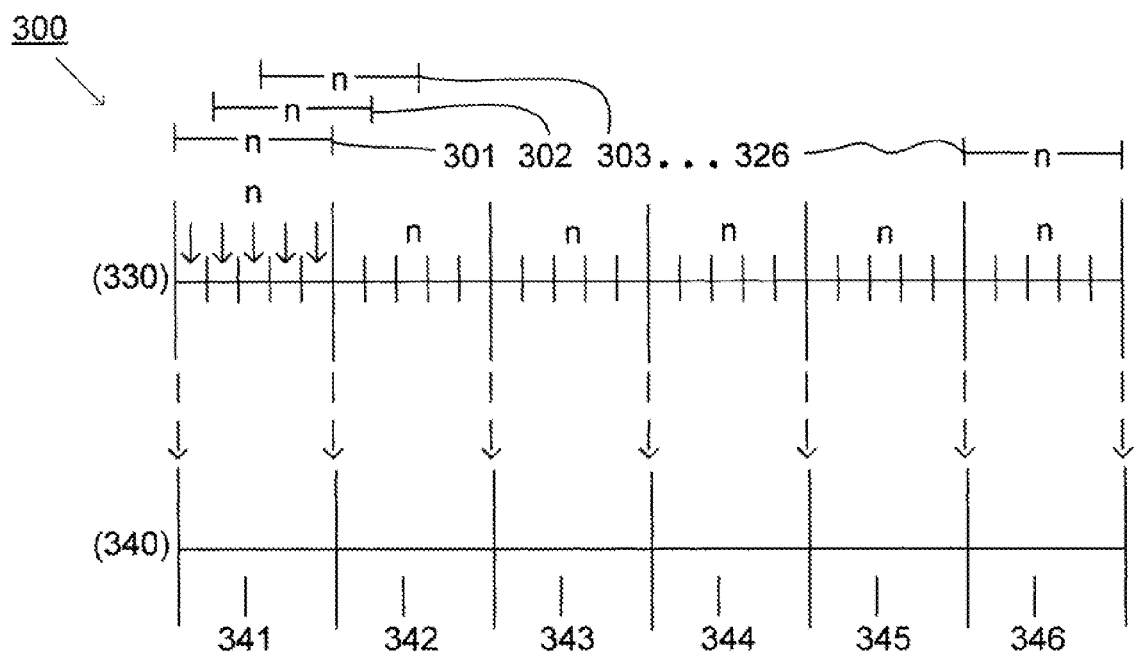
FIGS. 3a and 3b are data streams showing an exemplary content-defined chunking technique or policy that may add together or amalgamate small chunks into large chunks within long stretches of non-duplicate data and/or may not amalgamate the small chunks at the edges of the non-duplicate data to better identify potential duplicates within such transition regions, according to at least one embodiment.
Figure 3B:
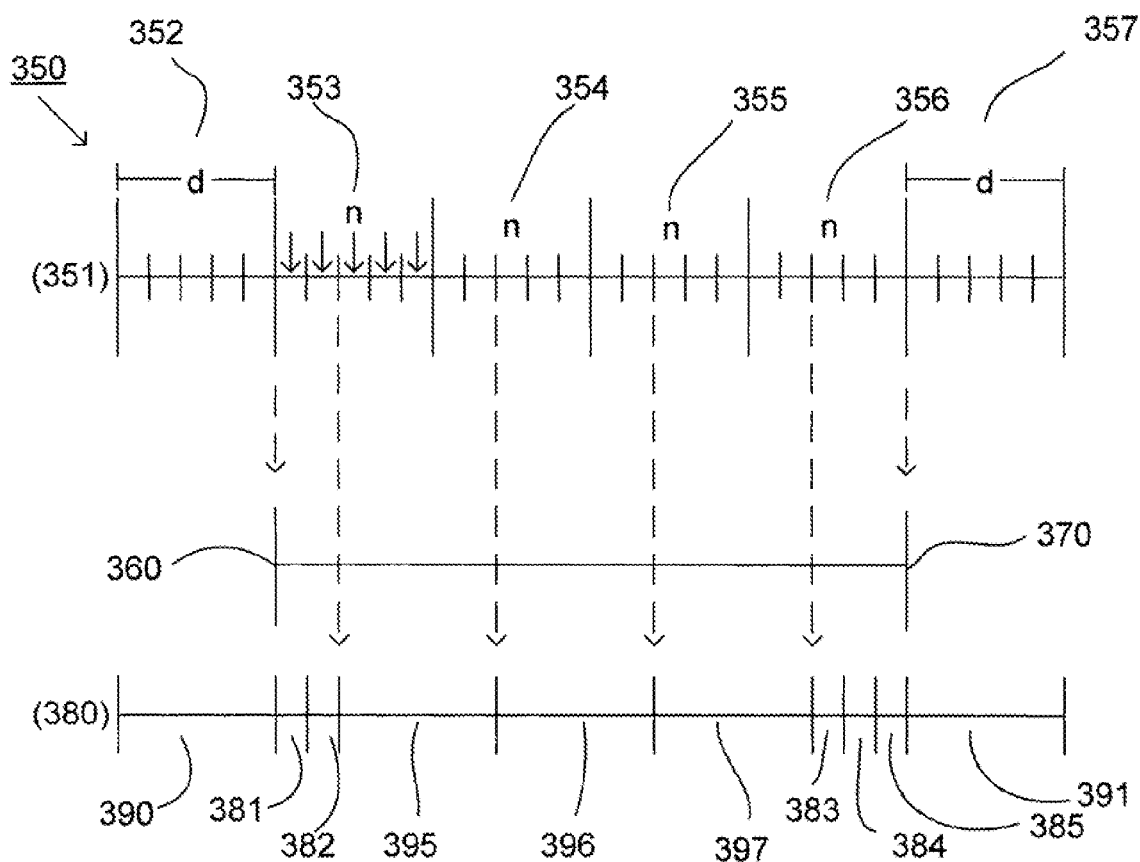

FIGS. 3a and 3b are data streams for an exemplary content-defined chunking policy that may be used in, for example, step 230 of FIG. 2. This example policy may: (i) amalgamate small chunks into large chunks within long stretches of non-duplicate data, while (ii) bordering the edges of non-duplicate data regions that are adjacent to duplicate data with small chunks by not amalgamating them, and/or (iii) re-emitting large chunk(s) which are found to be duplicate(s). In this exemplary case, Principles 1 and 2 may be applied for setting up data cut, break, block or chunk points, particularly in a situation in which large strings of the data stream are likely to be duplicated over time, for example, when archiving or backup data is being processed. In FIGS. 3a and 3b, the data streams 300 and 350, respectively, illustrate data chunking procedures that may include a process for changing or modifying a chunking proposed for their data stream. In FIG. 3a, the initial proposed data stream cut, break, block or chunk points at first earlier time chunking time, for example a first week, may include an excerpt of the data stream shown here as 330. In this case there may be a long sequence of, for example, 30 data groups, blocks or chunks that may have been produced by a content-defined chunking procedure (e.g., 220 in FIG. 2) in which no duplicate data is found. The assignment of non-duplicate status is indicated by the designation "n". Data chunking procedure 300 may, as indicated, determine that each of the 30 individual chunks are non-duplicate as well as determining that all amalgamations of five contiguous chunks, 301-326, are non-duplicate. In this case, the chunk amalgamation policy 230 illustrated in procedure 300 may choose to form large chunks by amalgamating consecutive groups of five small chunks, resulting in an output stream 340 that consists of, for example, six large chunks 341-346.

In FIG. 3b, which may correspond to, for example, a second later time, the proposed chunking of an excerpt of the input stream 351 once again contains 30 chunks. As shown data stream 351 may include a plurality of duplicate data blocks or chunks, e.g., the first five chunks 352, considered together, and final five chunks 357, considered together, may be duplicates (designated as 'd' and referred to as large duplicates). Since it advantageous to retain duplicate large chunks, the small chunks comprising 352 and 357 may be chosen to be amalgamated within the output stream 380, producing large chunks 390 and 391. The two groups of duplicates 352 and 357 may bound a string of twenty data blocks or chunks 353-356 that have been assigned, for example, non-duplicate status. Within blocks 353-356 the "n" designates a failure to find duplication either as individual chunks or as any group of five consecutive chunks. Principle 1 suggests that this large amount of non-duplicate data between chunk points 360 and 370 may be grouped together using a chunk combining or amalgamating procedure. However, based on Principle 2 (not producing large chunks which straddle or lie sufficiently close to boundaries between data considered to be duplicate and data which is non-duplicate), it may be best to partition non-duplicate region 360-370 to include initial and final buffer zones of small chunks. If the change region 360-370 is sufficiently small (e.g., a small number of consecutive data groups or "short hole" of non-duplicate data), the procedure may choose to emit the entire region of contiguous chunks without performing any amalgamation. Alternatively, as presented in the exemplary output stream 380, the combining or amalgamation procedure may choose to emit the region from 360-370 as three large chunks 395, 396 and 397 preceded by two smaller chunks 381 and 382, and followed by three smaller chunks 383, 384 and 385. As such, the output stream 380 may contain a transition region of non-amalgamated small chunks after transitions from regions considered to be duplicate to regions considered non-duplicate, and/or before transitions from non-duplicate to duplicate regions. A process incorporating procedures 300 and 350 to produce the effects shown by output streams 320 and 380 may result in improved performance for data streams typical of, for example, archival applications, Internet communications, etc., by maintaining an acceptable amount of duplicate detection and/or increasing the average size of stored or transmitted data segments.

Figure 4A:
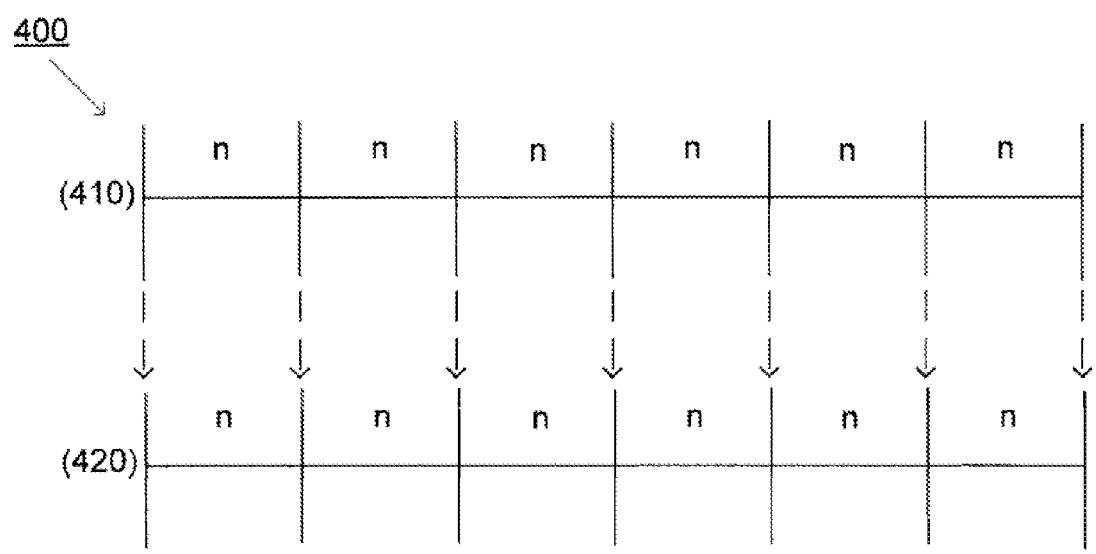
FIGS. 4a and 4b are data streams showing an exemplary content-defined chunking technique or policy that may break apart or split larger chunks into smaller chunks at the edges of the non-duplicate data to better identify potential duplicates within such regions, according to at least one embodiment.
Figure 4B:
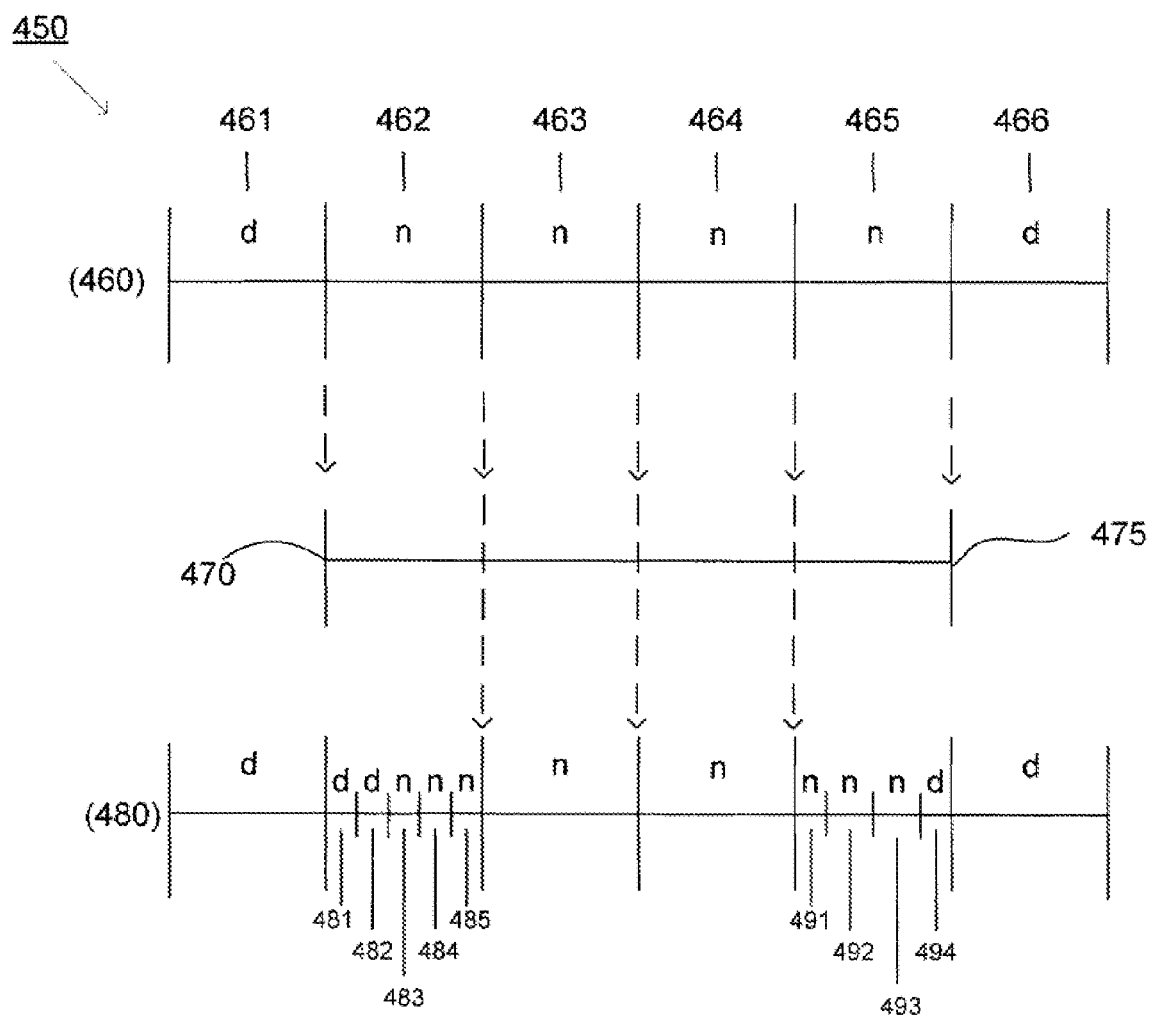

Referring to FIGS. 4a and 4b, data streams 400 and 450 are provided showing an exemplary content-defined chunking policy that may break apart or split larger chunks near the start and end of contiguous non-duplicate data which is bordered by duplicate data so as to better identify potential duplication within such regions, according to at least one embodiment of the present invention. Data streams 400 and 450 illustrate data chunking procedures that may include a process (corresponding to, for example, step 240 of FIG. 2) for changing or modifying the proposed chunkings 410 and 460, so as to produce exemplary outputs 420 and 480.

In FIG. 4a, the output of procedure 220 at a first earlier time, for example a first week, may include an excerpt of the data stream shown here as 410. In this case there may again be a sequence of data groups, blocks or chunks which have been classified as non-duplicates (designated by "n"). Six such chunks are displayed in 410. The chunking modification policy may choose to present these same chunks in its output stream 420, anticipating that these large blocks may have a good chance for reoccurring later, according to Principle 1. In FIG. 4b, the output of procedure 220 of FIG. 2 at a second later date, for example a second week, may include an excerpt of the data stream 460 in which, this time, some data groups, blocks or chunks have been determined to be duplicates (461 and 466, designated "d"), while others 462-465 have been determined to be non-duplicate (designated as "n"). A chunk modification policy may decide to pass duplicate chunks 461 and 466 unmodified to the output stream, since generally, large duplicate output chunks are desirable. In this case, the region between cut, break, block or chunk points 470 and 475 consists entirely of groups, blocks or chunks having been identified as non-duplicate. A chunking modification policy, having determined that point 470 begins a non-duplicate region, may choose to split one initial chunk, 462, using an alternate procedure producing shorter average chunk lengths, while not modifying a region of interior non-duplicate chunks. This same policy, having determined that point 475 initiates a region of duplicates following a region of non-duplicates may also decide to split one preceding chunk, 465, with, for example an alternate procedure producing shorter average chunk lengths. As shown, the initial non-duplicate data block 462 may produce a plurality of smaller blocks or chunks 481-485, while the final non-duplicate data block may produced the four blocks, 491-494, in the output stream. In this way, the smaller chunks may be better at catching more duplicate data blocks since this policy may be able to better demarcate the start and end of change regions within the original data stream 460. For example, as shown in FIG. 4b the output stream may in fact duplicate blocks 481, 482 and 494.

One skilled in the art will recognize that specific implementations of procedures related to data streams 300, 350, 400 and 450 may vary in details of how duplicate and/or non-duplicate regions are specifically defined, how long the buffer zone of small chunks may be chosen to be, the size of a small chunk or a big chunk, etc. Small (or smaller) chunks may have typical sizes of approximately 2-18k, and for random data inputs may exhibit a chunk size distribution resembling an exponential distribution. Larger or big chunks in a simple amalgamation embodiment may, for example, be always constituted by exactly eight consecutive small chunks, with a correspondingly larger range of chunk sizes and may average a size of approximately 16k-144k (e.g., 8 times larger), and may exhibit a narrower chunk size distribution narrower than exponential when presented with random input data.

In various implementations, a first segmentation procedure may be followed by a second segmentation procedure, and the expected average data group size of the first data segmentation procedure and the second segmentation procedure may be different. The expected average data group size is the statistically expected rate of selecting chunking boundaries when presented with an input stream containing random input data. The expected data group size may be related to a selection criterion, as explained in the related patent application METHODS AND SYSTEMS FOR DATA MANAGEMENT USING MULTIPLE SELECTION CRITERIA to Cezary Dubnicki, Erik Kruus, Cristian Ungureanu, and Krzysztof Lichota or as suggested by equation (1) the theoretical expectation for chunk size s (in absence of min or max chunk size limitations) as indicated above. Some implementations may prefer to utilize the actual length or amount of the underlying data stream to govern amalgamation limits, or various limits related to assignment of duplicate or non-duplicate status, or limits related to how much data should get amalgamated, rather than using "chunks" as the unit of calculation, as in FIG. 3. Other implementations may include several ways or degrees to which the small chunks may be amalgamated. Some implementations may, additionally or alternatively, choose to use further (and indeed substantially different) characteristics of the input stream to guide the decision-making processes between small chunks and large chunks. For example, implementations may include inputs to guide chunking policies 230 and/or 240 that arise from statistical models of the previous data inputs and/or outputs to guide transitions between chunking procedures of different expected output chunk lengths. Other useful inputs to such policies may include compressibility estimates based, for example, on prior history or fast entropy estimation methods (e.g. Renyi entropy).

Some implementations may also include the possibility of setting or dynamically changing the chunking size based on the current status of results relative to present duplication elimination goals. For example, if the procedure is achieving duplicate elimination goals, then the procedure may switch to chunking new non-duplicate data with a larger average chunk size and also reduce metadata. Alternatively, if the duplicate elimination goals are not being met, the procedure may switch to large chunk sizes that are a little bit smaller. Some implementations may also include the possibility of setting or dynamically changing the chunking size based on the current status of results relative to the average data group size goals. If the average chunk size of the output stream of the procedure is exceeding goals, then, for example, the procedure may amalgamate a lesser number of chunks in regions of completely new data if it is able to later properly handle duplication queries for consecutive numbers of a variable number of smalls chunks (up to some max). Some implementations may also include the possibility of setting or dynamically changing the chunking size based on the current status with respect to estimated or actual compressibility of small and/or larger data groups or on the theoretical or experimental model of duplication elimination characteristics. If an assessment of previous performance, for example, shows that at a small-chunk level, for example, entering a non-duplicate region is quite likely to involve an initial sequence of small chunks the first three of which are particularly likely to be duplicate, while the next 8 or more are particularly likely to be non-duplicate, then the procedure might adjust the number of small chunks in border regions to, for example, three small chunks (rather than, e.g., four or two). Some implementations may also include the possibility of applying second data segmentation procedure multiple times so as to further improve the ultimate chunk size and/or DER. For example, the procedure may be modified for splitting apart; suppose an initial small chunking begins with a finer-grain extension of the region with duplicate status, then the first non-duplicate region could conceivably be split at even finer scale to more closely terminate the region of duplication. Such a process may be terminated when the metadata costs associated with the increased number of smaller and smaller chunks outweighed the DER benefits (as may be based on predetermined or dynamically varying goals).

Note that the input data streams for FIGS. 3a, 3b, 4a and 4b may correspond to identical excerpts of an original data stream. In this case, it may be instructive to consider and compare the principle sources of additional processing effort required to assign duplicate/non-duplicate status. In FIGS. 3a and 3b, the number of queries for duplicate status may be bounded above by two queries per small chunk (maximally one query for a chunk duplication and one query for a duplication of five contiguous chunks). So in the case of identical input streams 330 and 410, the querying effort is bounded by 30×2=60 for FIG. 3a, and by 6 in FIG. 4a. Other implementations of an amalgamation process may permit variable-sized big chunks, in which a number of contiguous chunks may be amalgamated up to some predetermined maximum, or up to some predetermined maximum amount of underlying data. This still yields a constant amount of querying effort per unit of input, but the constant is larger. These considerations may have practical impact for system design. In fact, while numerous procedures are capable of producing outputs resembling output streams 380 and 480 when presented with contiguous regions of data which has been assigned non-duplicate status, a useful rule of thumb is that procedures which have more "flexibility" (i.e. allow a larger number of positions and/or lengths for amalgamated chunks) may achieve a higher amount of duplicate elimination. This performance benefit may need to be balanced with the cost of the additional queries. Note, that this cost is roughly constant, regardless of the scale of data previously stored, whereas some techniques that include resemblance detection and delta compression in an archiving system may scale linearly (or worse) with the amount of data stored. The small additional cost and excellent scalability of the proposed systems and methods may make these approaches preferable to other available systems and methods of improving the duplicate elimination and speed of data processing for data archival, data communication systems, etc.

Each of the aforementioned procedures may be performed using a relatively simple process, software, or algorithm, and thus would require only a small amount of processing time with the potential for increasing duplicate data recognition and improving the DER. Further, each procedure may in various embodiments be implemented using a short or small look ahead buffer. This look ahead buffer may even be helpful at assisting in resynchronization if a small amount of data is inserted within a large stream of duplicate data. In the case the look ahead buffer does not identify a shift in the present data stream from prior data streams, a major resynchronization may be required. This resynchronization may be predetermined based on the particular type of data in the data stream being processed. Various embodiments may also include one or more backup cut, break, block, or chunk points to assist in resynchronization. In any case, a plurality of more detailed flow charts and examples will now be provided to further describe some embodiments of the present invention. It should also be noted that while various large and small chunks have been drawn with equal lengths in the examples shown in FIGS. 3a, 3b, 4a, 4b, individual chunks may include a varying numbers of bytes of the underlying data stream, and that actual lengths of data streams associated with what are referred to as small and large chunks may vary from one small/large chunk to the next such chunk. For example, some large chunks, whose data content is strictly larger than that of any of the underlying non-amalgamated chunks, may be smaller than individual small chunks produced in other regions of the input data stream. Thus, the chunks may actually be variable-sized and not fixed-size as might be suggested by the figures.

Considerably more flexibility in generating variably sized chunks may be afforded by running a procedure that creates smaller chunks first, followed by chunk amalgamation into big chunks. There are many possible ways to make the amalgamation decision, and one important difference is the number of queries per small chunk that may be needed to make chunking decisions. For example, a simple approach may be to make large or big chunks generated by the concatenation of a fixed or given number, N, of consecutive small chunks. This approach may bound the number of big chunk existence queries to, for example, 1 per small chunk. Another possibility may be to allow large chunks to be 2 . . . N consecutive small chunks, with a higher bound for the number of queries required. Using information about non-emitted smalls (i.e. the small chunks that were not emitted because they were part of some big chunk) may be less desirable, since there may be a large amount of small chunk "metadata" that needs to be stored somehow.

A simple exemplary chunk amalgamation procedure or algorithm may be, for example:

```
1 void process( SmallChunkLookAheadBuffer buf[0 to 2k-1] ) {
2   if( isDupBig(buf[0]) ) emit big @ buf[0 to k-1];
3   else if( (then=findDupBigStarting(buf[1 to k]) )
4     emit smalls until then, followed by a big;
5   else if( isPrevDupBig ) emit k smalls;
6   else emit big @ buf[0 to k-1]
7 }
```

Such a procedure admits flexibility by allowing various reasonable ways in which component steps are precisely defined. Here, 'buf' may refer to a look-ahead buffer containing, for example, up to 2k−1 chunks. The 'is DupBig(buf[0])' may check to see whether a first small chunk may be part of a previously emitted amalgamated chunk. In various embodiments, this may require checking whether a single large chunk encompassing buf[0] to buf[k−1] is a duplicate, for example. If so buf[0 . . . k−1] may be re-emitted as a large chunk once again ('emit big@buf[0 to k−1]'). In other embodiments, is DupBig(buf[0]) may check for duplicate status by querying whether any amalgamation buf[0 . . . N] has been previously emitted for some N in k−1 to 2, and if so, may emit an amalgamated (big) chunk encompassing buf[0] to buf[N]. The 'findDupBigStarting' may invoke a procedure similar to 'is DupBig(buf[0])' except that it may sequentially invoke is DupBig starting at increasing offsets within the lookahead buffer, buf. If such a forward-looking longest, first amalgamated chunk is found to have been previously emitted, then in line 4 smalls may be emitted beginning at buf[0], followed by the first amalgamated chunk found by line 3. The 'is PrevDup' queries a state variable for the duplication status of the chunk that was emitted immediately before buf[0]. It may be implemented as a state variable that reflects the assigned duplication status of the previous emission and/or by storing true if the previous emission was an amalgamated chunk consisting of more than one small chunk. Other embodiments may instead assign a 'true' duplication status to any duplicate previous emission (one or more small chunks). Additionally, big chunk formation criteria may include restriction of big chunks to ones exceeding a predetermined threshold of the size of the data stream underlying the big chunk. For simplicity we will henceforth speak of big chunks determined solely by a count of the small chunks during an amalgamation procedure. With fixed-size big chunks the process may make at most 1 query per small chunk, while for variable-size big chunks it may make up to k−1 queries per small chunk. Other variations include modifying the notion of whether a single small chunk is considered sufficient to generate a (logical) duplicate/non-duplicate transition. If such an algorithm were written without a look ahead buffer, then the findDupBigStarting ( ) predicate is unavailable. In such cases, it may be possible for two duplicate input streams to remain out-of-synch indefinitely. This may be avoided by introducing resynchronization cut points: whenever the cut point level of a small chunk exceeds some threshold, that small chunk may be allowed to terminate a big chunk, but may not be allowed to occur elsewhere in the interior of a big chunk. In this fashion, two duplicate input streams may be forcibly resynced after a resynchronization cut point in algorithms that do not have sufficient look ahead to do so spontaneously.

Figure 5A:
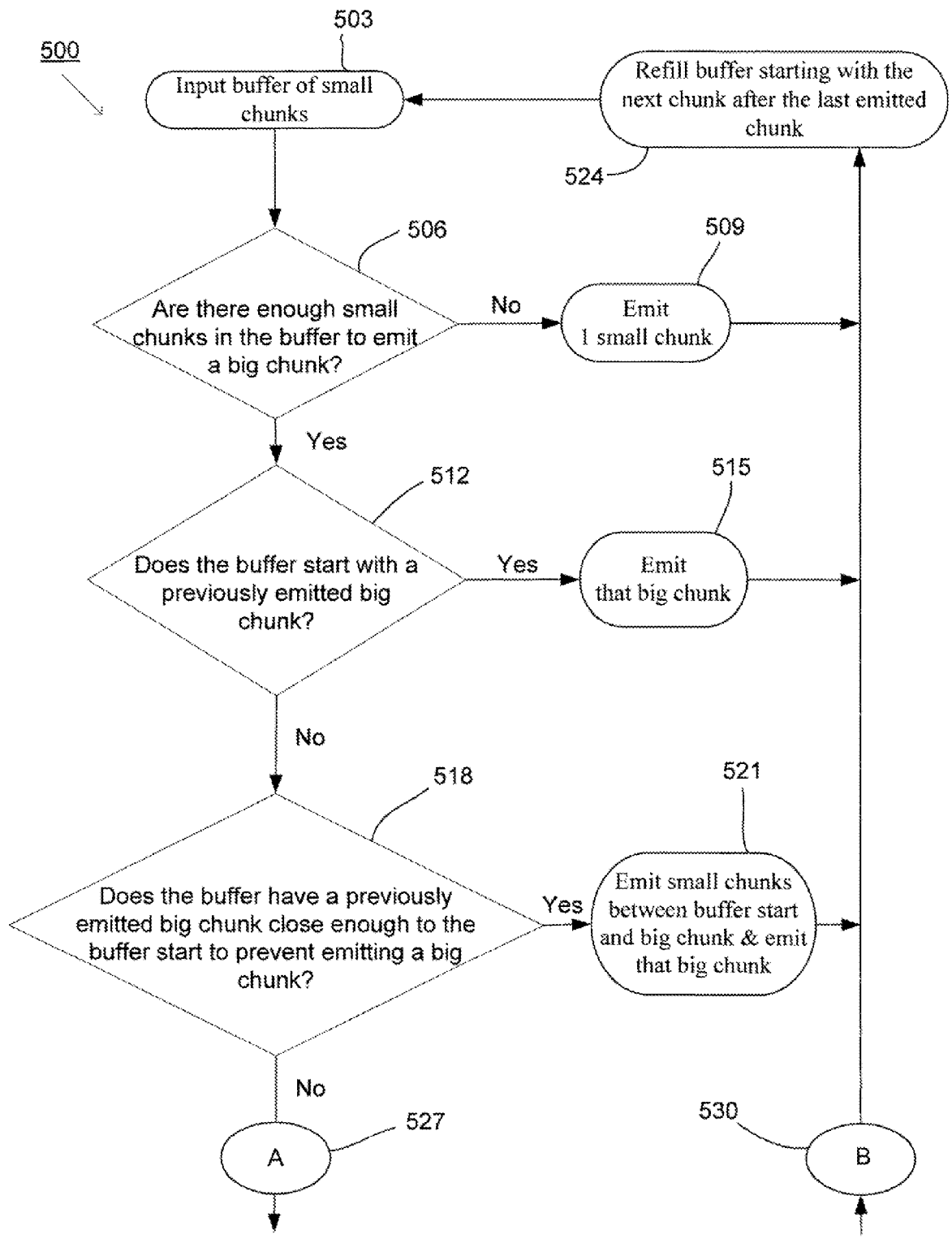
FIGS. 5a and 5b is a flow chart of an exemplary content-defined chunking technique or policy that may amalgamate small chunks into large chunks and/or border the edges of the non-duplicate data with small chunks and/or leave small chunks within short regions of non-duplicate data, according to at least one embodiment.
Figure 5B:
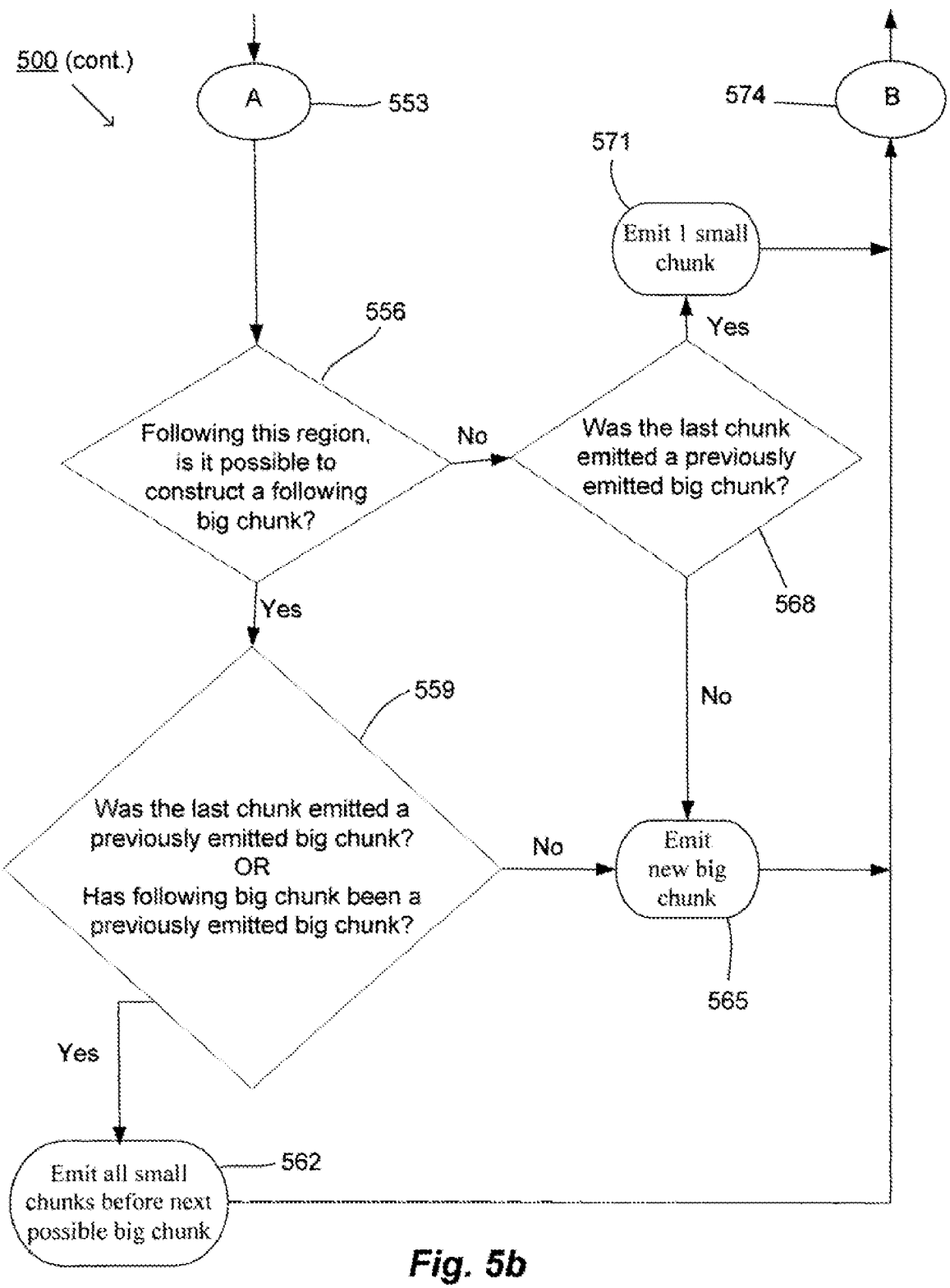

Referring now to FIGS. 5a and 5b, an exemplary flow chart 500 of a content-defined chunking policy is provided that may utilize a look-ahead buffer of fixed size to amalgamate or combine small chunks into large chunks within long stretches of new non-duplicate data, while bordering the edges of the non-duplicate data with small chunks and leaving small chunks within short regions of non-duplicate data. First, at 503, an input buffer or look ahead buffer includes a number of smaller chunks. Then, at decision step 506, it is determined whether there are enough small chunks in the buffer to emit a bigger chunk of data. If not, then at step 509 1 small chunk may be emitted from the buffer and at step 524, the buffer may be refilled with the next chunk after the last emitted chunk. If there are enough small chunks in the buffer to emit a big chunk, then at decision step 512, it is determined whether the buffer starts with a previously emitted big chunk. If yes, at step 515, that big chunk may be emitted, followed by refill buffer step 524. If not, then at step 518 a decision step determines if the buffer has a previously emitted big chunk close enough to the buffer start to prevent emitting a big chunk. If so, then at step 521, the process will emit small chunks between the buffer start and the big chunk and emit that big chunk, followed by refill buffer step 524. However, if the buffer does not have a previously emitted big chunk close enough to the buffer start to prevent emitting a big chunk, then the process proceeds to step decision step 556. At decision step 556, it is determined whether the buffer has enough small chunks, following the point at which no previously emitted big chunk could possibly be close enough to the buffer start to prevent emitting a big chunk (buffer start plus big chunk length), to permit the construction of a following big chunk. If not, then at step 568, the process determines if the last chunk emitted was a previously emitted big chunk. If this is so, then at step 571, the process may emit 1 small chunk, followed by refill buffer step 524. If the answer to step 568 is no, then at step 565 a new big chunk is emitted. If at step 556 it is determined that a following big chunk can be constructed, then decision step 559 is performed. At decision step 559, it is determined whether the last chunk emitted at step 524 was a previously emitted chunk or if the following big chunk was previously emitted. If the answer to decision step 559 is no, then at step 565 a new big chunk is emitted. If the answer at decision step 559 is yes, then at step 562 all small chunks are emitted before the next possible big chunk is determined. In either case, the refill buffer step 524 follows.

Figure 6A:
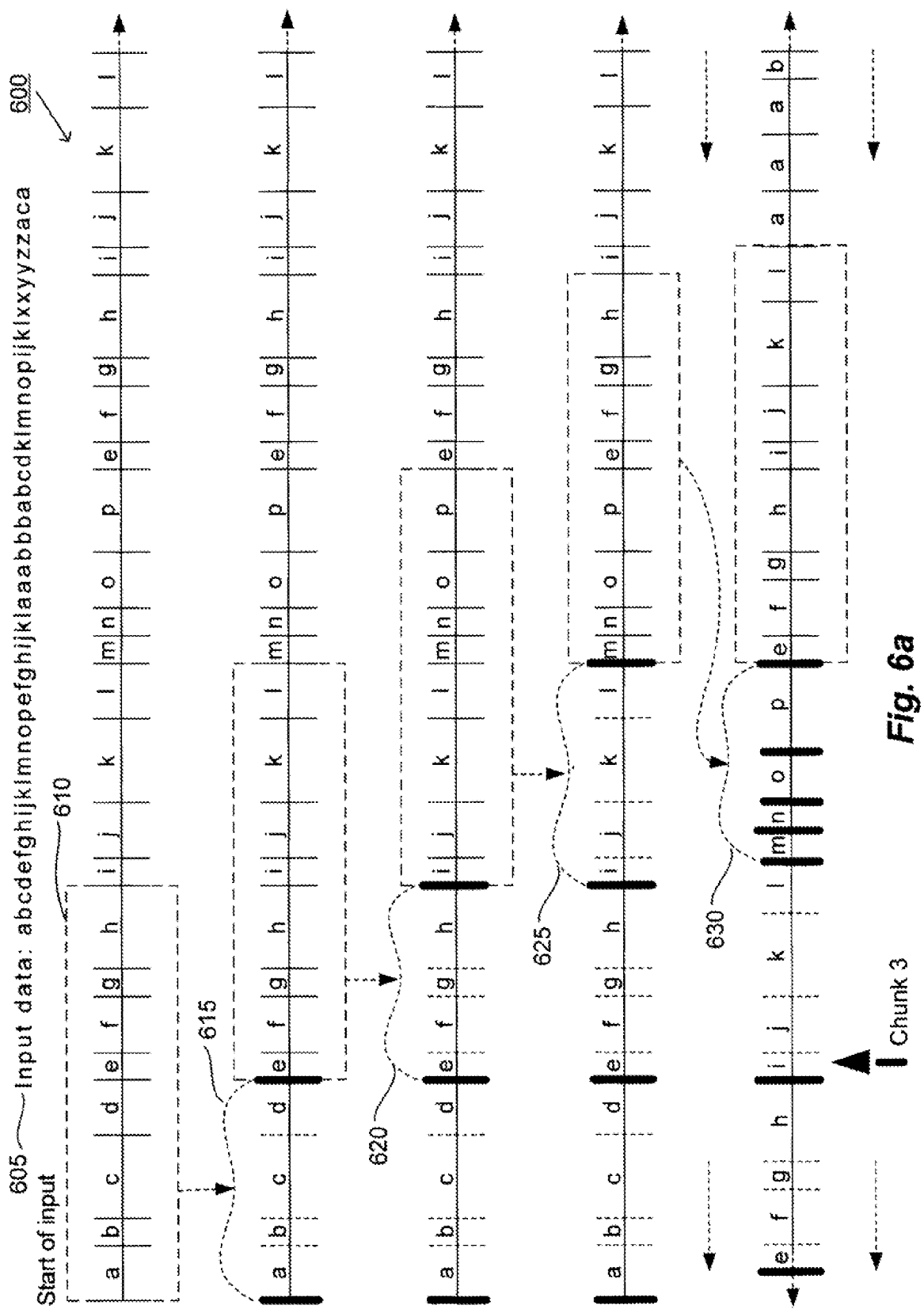
FIGS. 6a, 6b, and 6c are timing diagrams of an exemplary application of a content-defined chunking amalgamation technique or policy for a data set or a data input stream, according to at least one embodiment.
Figure 6B:
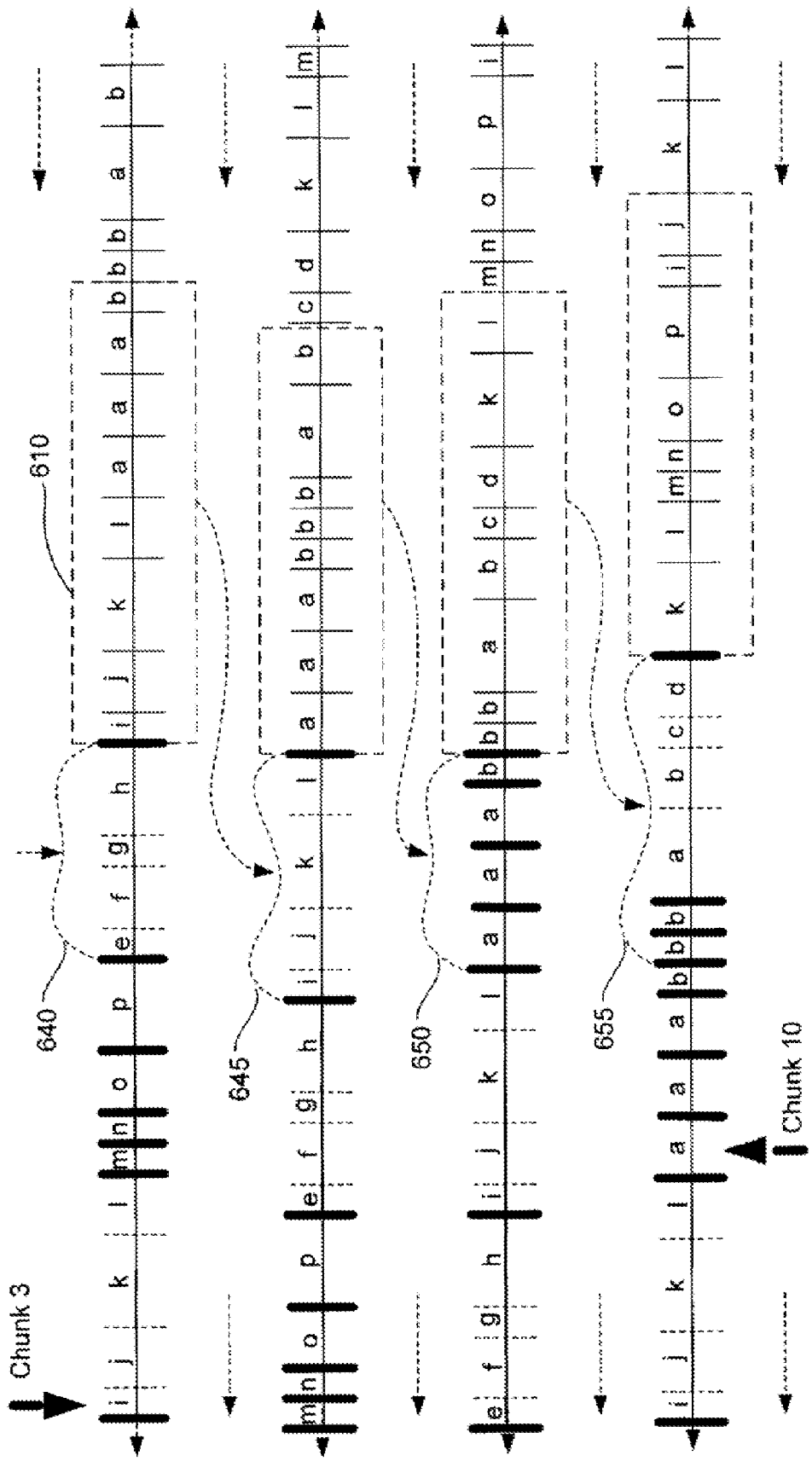
Figure 6C:
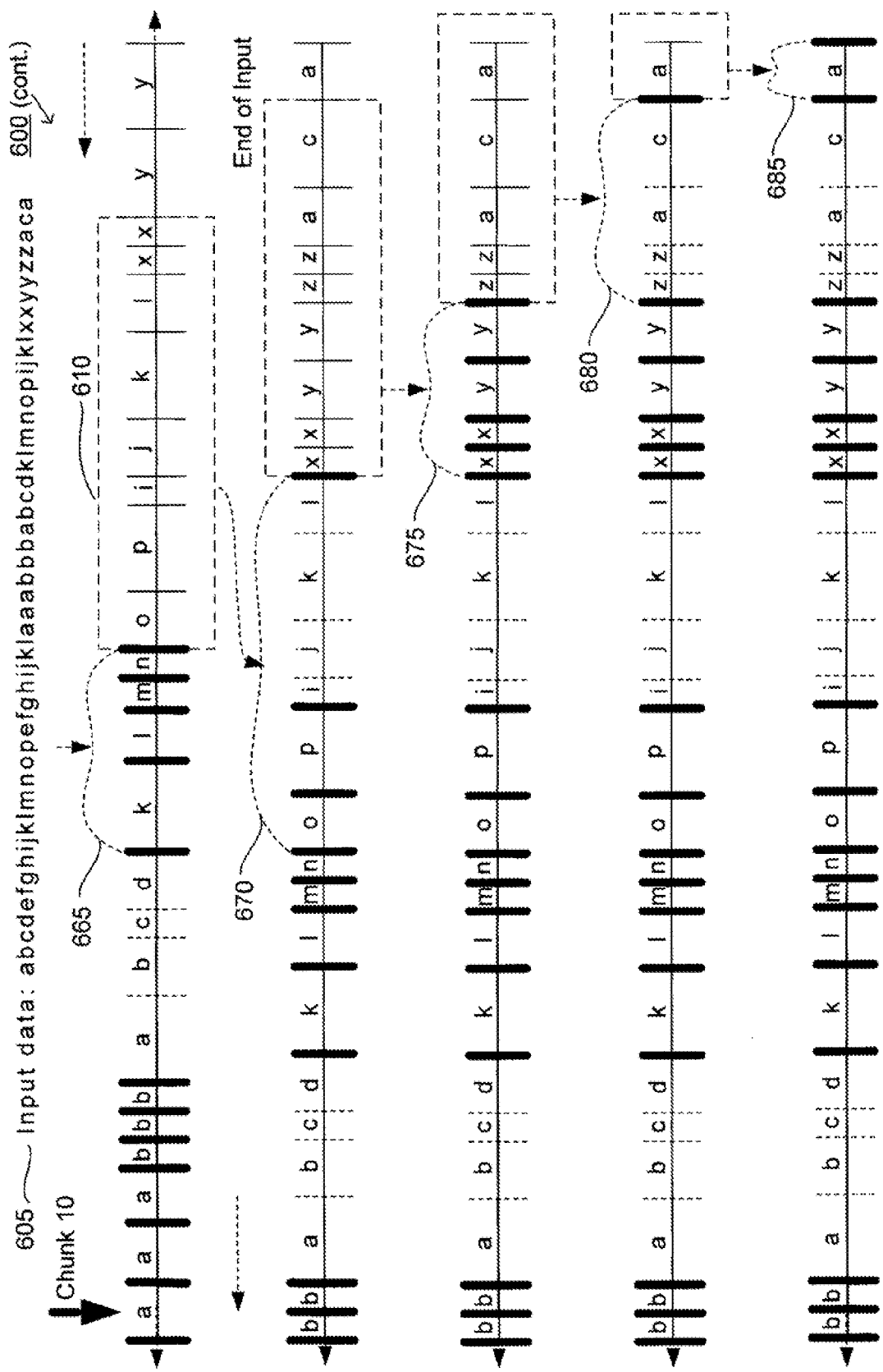

Referring to FIGS. 6a, 6b, and 6c, an exemplary illustration 600 of the application of a content-defined chunking amalgamation policy to a data input stream, according to at least one embodiment. First, an input data stream 605 is shown to consist of an exemplary series of small chunk hash values, where each exemplary hash value is represented by an individual character. The exemplary input data stream 605 would be the result of the application of a first standard content defined chunking algorithm. The second modifying selection function consisting of a content-defined chunking amalgamation function according to FIGS. 5a and 5b is then applied to the exemplary input data stream 605 by iteratively looking at the input data stream 605 with a look ahead buffer 610. The look ahead buffer 610 has an exemplary capacity of eight (8) small chunks. In this example, the chunking policy illustrated restricts a prospective big chunk to consist of exactly four small chunks. Initially the look ahead buffer 610 is filled with the small chunks, or more specifically the hash values of those chunks, at the beginning of the input data stream 605, "abcdefgh." After each decision to emit either amalgamated small chunks or un-amalgamated small chunks, the look ahead buffer 610 is filled up to capacity beginning with the chunk after the last emitted chunk. For example, when the look ahead buffer 610 initially contains the eight (8) small chunks "abcdefgh" at the start of the input data stream 605, the small chunks "a," "b," "c," and "d" are amalgamated into a new big chunk "abcd" 615 and emitted as such because neither these first small chunks nor the next possible big chunk "efgh" 620 have ever been seen before. After the look ahead buffer 610 is refilled starting with the next chunk "e" after the last previously emitted chunk "abcd" 615, the small chunks "e," "f," "g," and "h" are also amalgamated into a new big chunk "efgh" 620 and emitted as such because neither the last chunk emitted, "abcd" 615, nor the next possible big chunk "ijkl" 625 are duplicate big chunks. After the look ahead buffer 610 is refilled starting with the next chunk "i" after the last previously emitted chunk "efgh" 620, the small chunks "i," "j," "k," and "l" are also amalgamated into a new big chunk "ijkl" 625 and emitted as such because neither the last chunk emitted, "efgh" 620, nor the next possible big chunk "mnop" are duplicate big chunks. After the lookahead buffer 610 is refilled starting with the next chunk "m" after the last previously emitted chunk "ijkl" 625, the small chunks "m," "n," "o," and "p" are not amalgamated into a new big chunk and are all emitted as small chunks "m," "n," "o," and "p" 630 because while the last chunk emitted "ijkl" 625 is a nonduplicate big chunk, the next possible big chunk "efgh" 640 has been seen before at 620.

Referring now to the continuation of this exemplary conceptual illustration 600 in FIG. 6b, after the look ahead buffer 610 is refilled starting with the next chunk "e" after the last previously emitted chunk "p" 630, the small chunks "e," "f," "g," and "h" are amalgamated into a new big chunk "efgh" 640 and emitted as such because these chunks, as the start of the look ahead buffer 610, constitute a previously emitted big chunk as seen before at 620. After the look ahead buffer 610 is refilled starting with the next chunk "i" after the last previously emitted chunk "efgh" 640, the small chunks "i," "j," "k," and "l" are amalgamated into a new big chunk "ijkl" 645 and emitted as such because these chunks, as the start of the look ahead buffer 610, constitute a previously emitted big chunk as seen before at 625. After the look ahead buffer 610 is refilled starting with the next chunk "a" after the last previously emitted chunk "ijkl" 645, the small chunks "a," "a," "a," and "b" are not amalgamated into a new big chunk and are all emitted as small chunks "a," "a," "a," and "b" 650 because while the next possible big chunk "bbcd" has never been seen before, the last chunk emitted "ijkl" 645 was a big chunk that had been seen before at 625. After the look ahead buffer 610 is refilled starting with the next chunk "b" after the last previously emitted chunk "b" 650, the small chunks "b" and "b" are not amalgamated into a new big chunk, being emitted as small chunks "b" and "b" 655, while the small chunks "a," "b," "c," and "d" are amalgamated into a new big chunk "abcd" 655 and emitted as such, because the previously emitted big chunk "abcd" 655 was sufficiently close to the start of the look ahead buffer 610 to prevent the emission of the potential big chunk "bbab."

Referring now to the continuation of this exemplary conceptual illustration 600 in FIG. 6c, after the look ahead buffer 610 is refilled starting with the next chunk "k" after the last previously emitted chunk "abcd" 655, the small chunks "k," "l," "m," and "n" are not amalgamated into a new big chunk and are all emitted as small chunks "k," "l," "m," and "n" 665 because while the next possible big chunk "opij" has never been seen before, the last chunk emitted "abcd" 655 was a big chunk that has been seen before at 615. After the look ahead buffer 610 is refilled starting with the next chunk "o" after the last previously emitted chunk "n" 665, the small chunks "o" and "p" are not amalgamated into a new big chunk and emitted as small chunks "o" and "p" 670, while the small chunks "i," "j," "k," and "l" are amalgamated into a new big chunk "ijkl" 670 and emitted as such, because the previously emitted big chunk "ijkl" 670 was sufficiently close to the start of the look ahead buffer 610 to prevent the emission of the potential big chunk "opij." After the look ahead buffer 610 is refilled starting with the next chunk "x" after the last previously emitted chunk "ijkl" 670, the small chunks "x," "x," "y," and "y" are not amalgamated into a new big chunk and are all emitted as small chunks "x," "x," "y," and "y" 675 because while the next possible big chunk "zzac" has never been seen before, the last chunk emitted "ijkl" 670 was a big chunk that had been seen before at 625. After the look ahead buffer 610 is refilled starting with the next chunk "z" after the last previously emitted chunk "y" 675, the small chunks "z," "a," and "c" are amalgamated into a new big chunk "zzac" 680 and are emitted as such because the look ahead buffer 610 has begun to run low on data (so that another big chunk could not be emitted in the next iteration if the look ahead buffer 610 started with the "a" after the potential big chunk "zzac") and the last chunk emitted "y" 675 was not a previously emitted big chunk. Finally, after the look ahead buffer 610 is refilled with the remaining small chunk "a" after the last chunk emitted "zzac" 680, the small chunk "a" cannot be amalgamated into a big chunk because there are no chunks to amalgamate it with and is emitted as a small chunk "a" 685. Therefore, applying the second modifying selection function (which consists of a content-defined chunking amalgamation function according to FIGS. 5a and 5b) to the input data stream 605 has resulted in the modification of chunks provided from the first standard chunking algorithm to be big within long regions of non-duplicate data, small at the borders of long regions of non-duplicate data, and small within short regions of non-duplicate data.

Figure 7A:
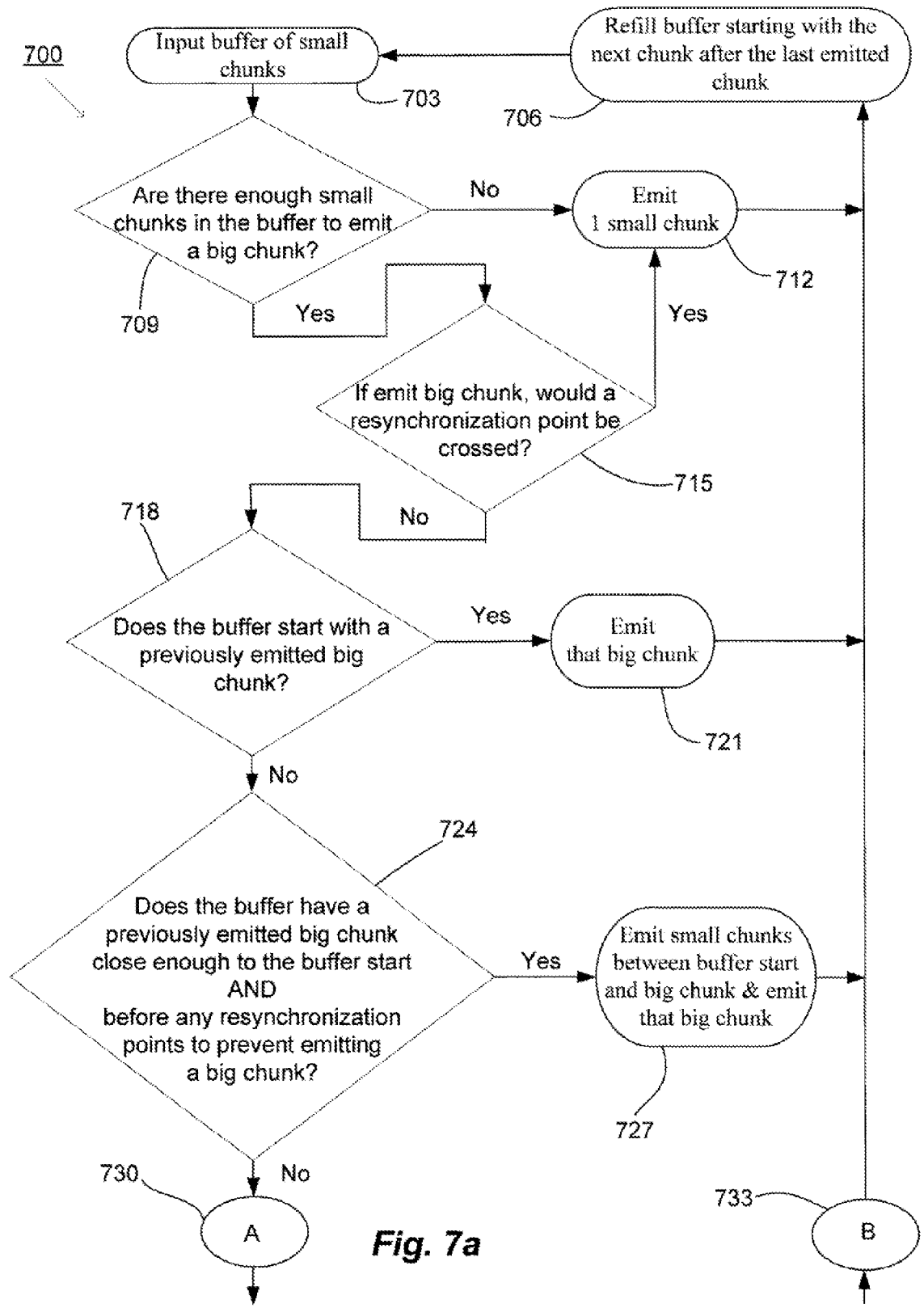
FIGS. 7a and 7b are a flow chart of an exemplary content-defined chunking technique or policy that may include resynchronization with amalgamating small chunks into large chunks, according to at least one embodiment.
Figure 7B:
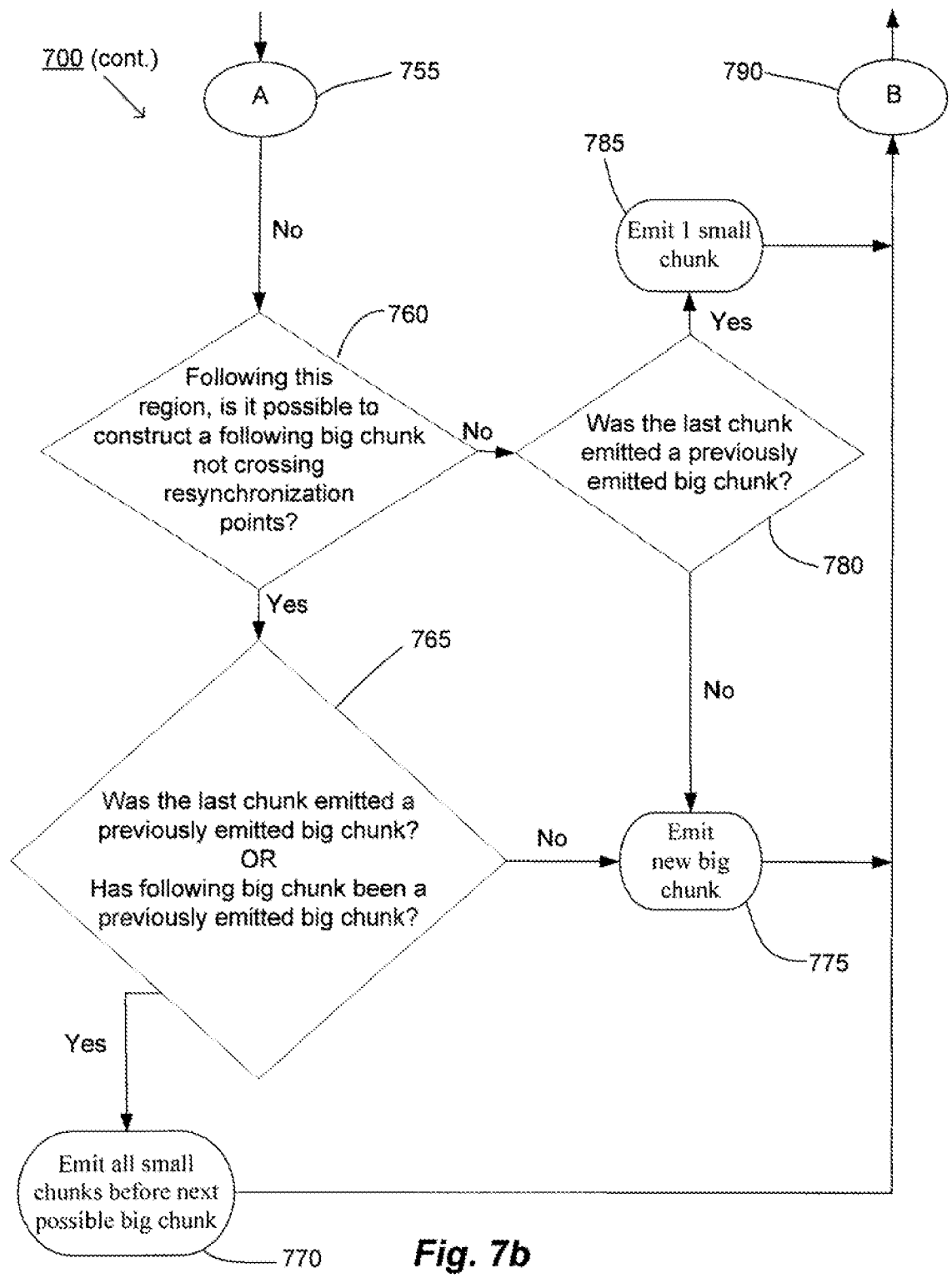

Considering resynchronization possibilities in pathological cases leads to an option to never allow a big chunk to straddle some high level of cut, block, break or chunk point. This option may eventually force resynchronization in a duplicate stream that otherwise theoretically could remain unsynchronized for a long period simply because the big chunks were always chosen in an offset fashion. FIGS. 7a and 7b provides an exemplary flow chart 700 of a content-defined chunking policy that utilizes a look-ahead buffer of fixed size as well as backup (e.g. resynchronization) chunk points to amalgamate small chunks into large chunks within long stretches of non-duplicate data as long as the large chunk would not straddle a resynchronization point, while also bordering the edges of the non-duplicate data with small chunks and leaving small chunks within short regions of non-duplicate data, according to at least one embodiment. First, at 703, an input buffer or look ahead buffer includes a number of smaller chunks. Then, at decision step 709, it is determined whether there are enough small chunks in the buffer to emit a bigger chunk of data. If not, then at step 712, one small chunk may be emitted from the buffer and at step 706, the buffer may be refilled with the next chunk after the last emitted chunk. If there are enough small chunks in the buffer to emit a big chunk, then at decision step 715, it is determined whether a resynchronization point be crossed if a big chunk is emitted. If not, then the process proceeds to step 718, to determine whether the buffer starts with a previously emitted big chunk. If yes, a resynchronization point would be crossed, then the process proceeds to step 712 and one small chunk may be emitted, followed by refill buffer step 706. If yes, at step 515, that big chunk may be emitted, followed by refill buffer step 706. If at step 718, it is determined that the buffer starts with a previously emitted big chunk, the process proceeds to step 721 to emit that big chunk, followed by refill buffer step 706. If not, then at step 724 a decision step determines if the buffer has a previously emitted big chunk which does not cross resynchronization points and is close enough to the buffer start to prevent emitting a big chunk. If so, then at step 727, the process will emit small chunks between the buffer start and the big chunk and emit that big chunk, followed by refill buffer step 706. However, if the buffer does not have such a previously emitted big chunk close enough to the buffer start to prevent emitting a big chunk, then the process proceeds to decision step 760. At decision step 760, it is determined whether the buffer has enough small chunks, following the point at which no previously emitted big chunk could possibly be close enough to the buffer start to prevent emitting a big chunk (buffer start plus big chunk length), to permit the construction of a following big chunk that would not cross resynchronization points. If not, then at step 780, the process determines if the last chunk emitted during step 706 was a previously emitted big chunk. If this is so, then at step 785, the process may emit 1 small chunk, followed by refill buffer step 706. If the answer to step 780 is no, then at step 775 a new big chunk is emitted. If at step 760 it is determined that a following big chunk that does not cross resynchronization points can be constructed, then decision step 765 is performed. At decision step 765, it is determined whether the last chunk emitted was a previously emitted chunk or if considering emission of a big chunk, the following big chunk was a previously emitted big chunk. If the answer to decision step 765 is no, then at step 775 a new big chunk is emitted. If the answer at decision step 765 is yes, then at step 770 all small chunks are emitted before the following big chunk is determined. In either case, the refill buffer step 706 follows.

An example of a simple chunk-splitting procedure or algorithm that re-chunks a non-duplicate big chunk either before or after a duplicate big chunk is detected is shown below.

```
1 for (each big chunk) {
2    if (isBigDup) emit as big;
3    else if (isPrevBigDup || isNextBigDup)
4       rechunk as smalls; // dup/nondup transition
5    else emit as big;
6 }
```

Here the primary pass over the data may be done with a large average chunk size, and a single non-duplicate data chunk after or before a duplicate big chunk may be re-chunked at smaller average block size. The process may modify such an algorithm to detect more complicated definitions of duplicate/non-duplicate transitions; e.g., when N non-duplicates may be adjacent to D duplicates, re-chunk R big chunks with smaller average size. Alternatively, the process could work with the actual lengths of the chunks to determine and deal with duplicate/non-duplicate transition points.

Figure 8:
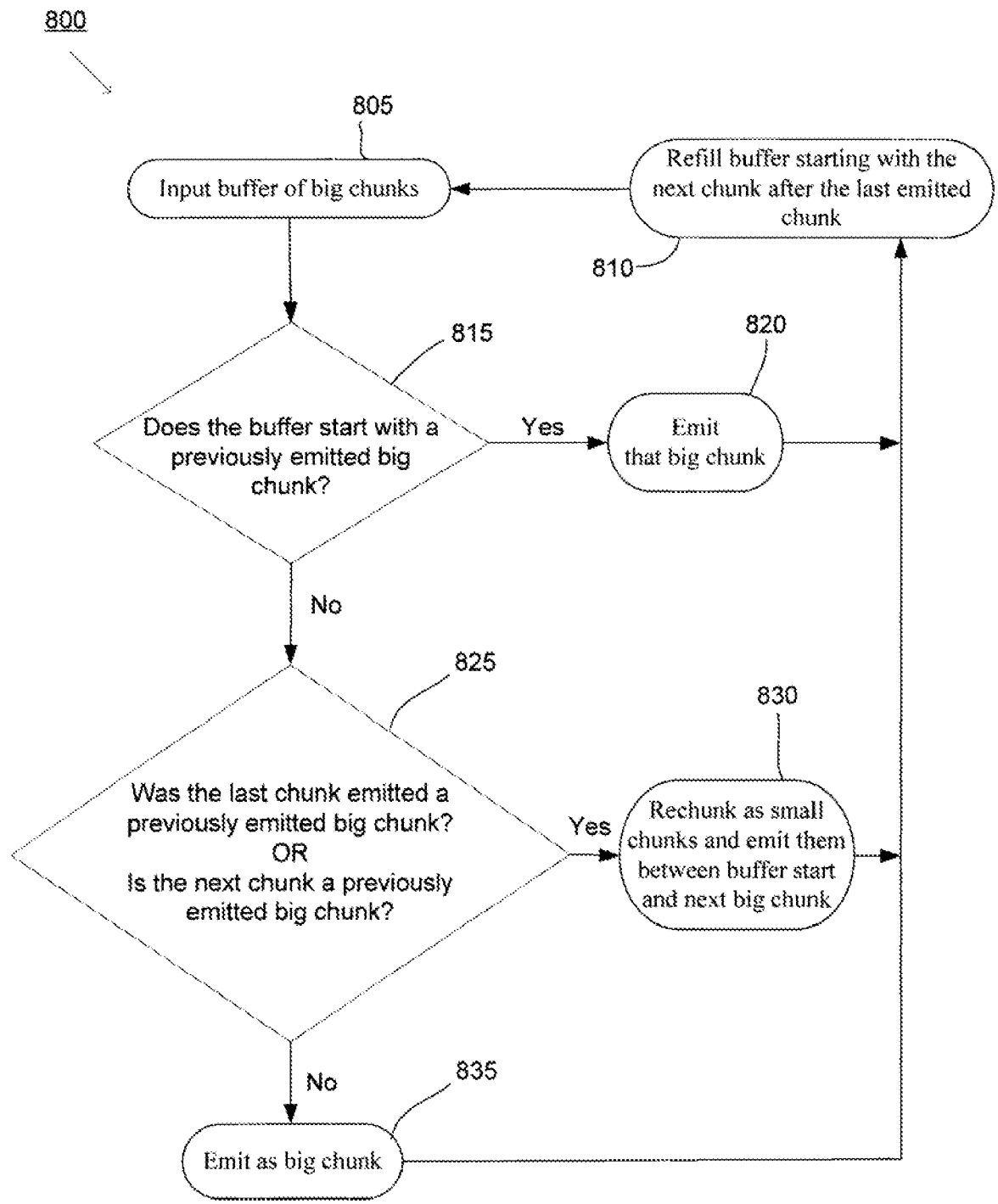
FIG. 8 is a flow chart of an exemplary content-defined chunking technique or policy that may split big chunks into small chunks, according to at least one embodiment.

Referring to FIG. 8, an exemplary flow chart of a content-defined chunking policy 800 that utilizes a look-ahead buffer of fixed size to split big chunks into small chunks within short stretches of non-duplicate data, while leaving big chunks within long stretches of non-duplicate data and splitting big chunks into small chunks along the borders of the long stretches of non-duplicate data, is provided. At step 805, an input buffer may include a plurality of big chunks. Then at decision step 815, the process may determine if the buffer starts with a previously emitted big chunk. If yes, at step 820 that big chunk is emitted, followed by the buffer being refilled starting with the next chunk after the last emitted chunk, at step 810. If not, then the process proceeds to decision step 825. At step 825, the process determines if the last chunk emitted was a previously emitted big chunk or is the next chunk a previously emitted big chunk. If either of these are true, then the process may proceed to step 830 and the large new chunk is split or re-chunked as a plurality of smaller chunks and they are emitted between the buffer start and the next big chunk. This step is followed by buffer refill step 810. However, if the answer to the question at step 825 is no, then at step 835 the chunk is emitted as a big chunk, followed by buffer refill step 810.

Figure 9A:
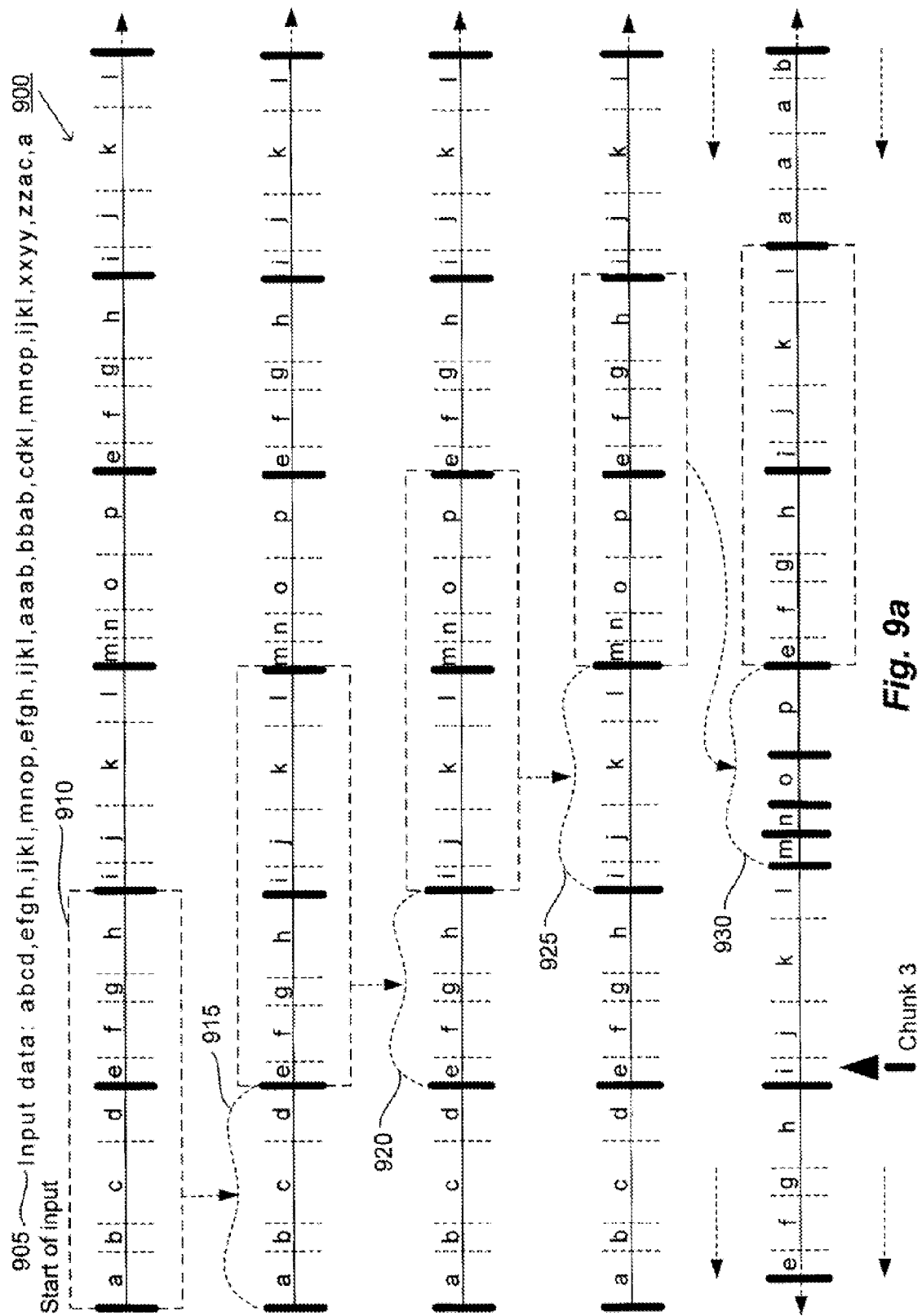
FIGS. 9a, 9b, and 9c are timing diagrams of an exemplary application of a content-defined chunking splitting technique or policy for a data set or a data input stream, according to at least one embodiment.
Figure 9B:
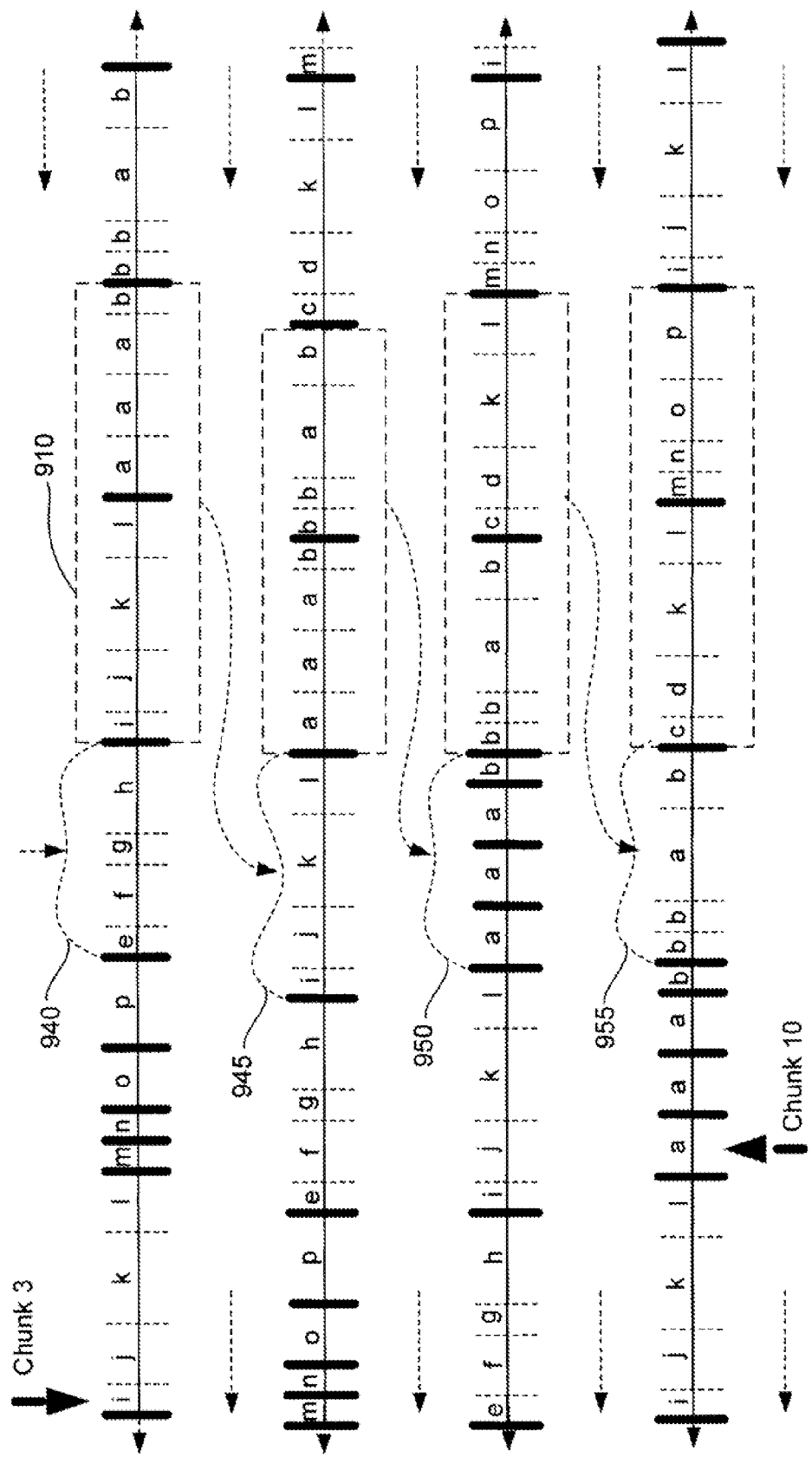
Figure 9C:
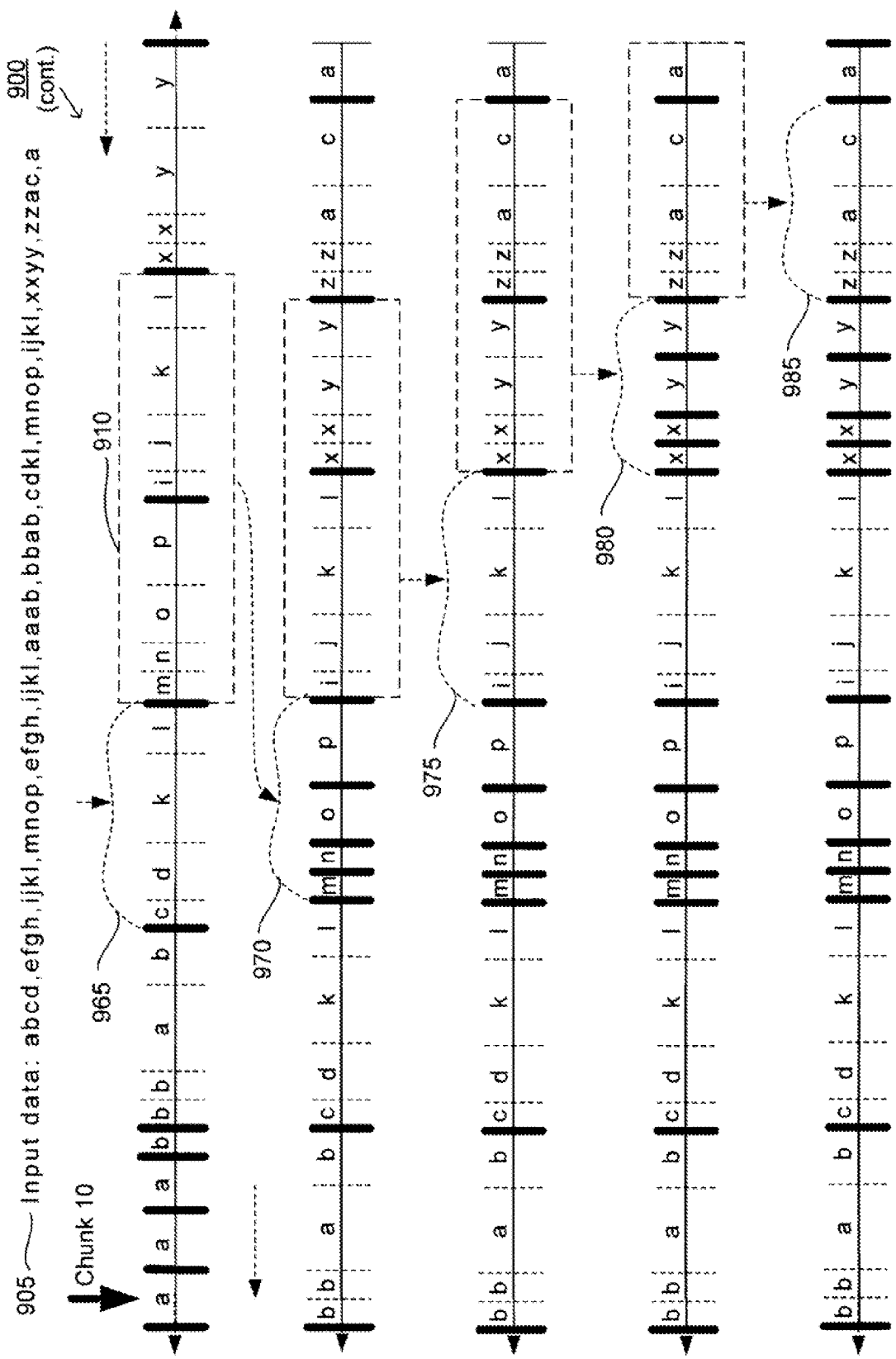

Referring to FIGS. 9*a*, 9*b*, and 9*c*, an exemplary illustration 900 of the application of the claimed second modifying selection function, which consists of a content-defined chunking splitting function according to FIG. 8, to an input data stream is provided, according to at least one embodiment of the present invention. Referring now to FIGS. 9*a*, 9*b*, and 9*c*, representing the conceptual illustration 900, 935, and 960, an input data stream 905 is shown to consist of an exemplary comma-delimited series of big chunk hash values, where each exemplary small chunk hash value is represented by an individual character and the big chunks are represented by concatenated characters. Although most big chunks have been depicted as each containing four small chunks the number of small chunks within each big chunk is in fact variable. The exemplary input data stream 905 would be the result of the application of a first standard content defined chunking algorithm (e.g., 220 of FIG. 2) designed to chunk with a large average chunk size. The second modifying selection function consisting of a content-defined chunking splitting function (e.g., 240 of FIG. 2) according to FIG. 8 is then applied to the exemplary input data stream 905 by iteratively looking at the input data stream 905 with a look ahead buffer 910. The look ahead buffer 910 has an exemplary capacity of two (2) big chunks. Initially the look ahead buffer 910 is filled with the big chunks, or more specifically the hash values of those chunks, at the beginning of the input data stream 905, "abcd" and "efgh." After each decision to emit either split small chunks or big chunks, the look ahead buffer 910 is filled up to capacity beginning with the chunk after the last emitted chunk. For example, when the look ahead buffer 910 initially contains the two (2) big chunks "abcd" and "efgh" at the start of the input data stream 905, the small chunks "a," "b," "c," and "d" remain as a big chunk "abcd" 915 and are emitted as such because neither this first big chunk nor the next big chunk "efgh" 920 have ever been seen before. After the look ahead buffer 910 is refilled starting with the next big chunk "efgh" after the last previously emitted chunk "abcd" 915, the small chunks "e," "f," "g," and "h" also remain as a big chunk "efgh" 920 and are emitted as such because neither the last chunk emitted, "abcd" 915, nor the next big chunk "ijkl" 925 have ever been seen before. After the look ahead buffer 910 is refilled starting with the next chunk "ijkl" after the last previously emitted chunk "efgh" 920, the small chunks "i," "j," "k," and "l" also remain as a big chunk "ijkl" 925 and are emitted as such because neither the last chunk emitted, "efgh" 920, nor the next big chunk "mnop" have ever been seen before. After the look ahead buffer 910 is refilled starting with the next chunk "mnop" after the last previously emitted chunk "ijkl" 925, the small chunks "m," "n," "o," and "p" are split up from being a big chunk "mnop" and are all emitted as small chunks "m," "n," "o," and "p" 930 because while the last chunk emitted "ijkl" 925 had never been seen before, the next big chunk "efgh" has been seen before at 920.

Referring now to the continuation of this exemplary illustration 900 in FIG. 9b, after the look ahead buffer 910 is refilled starting with the next chunk "efgh" after the last previously emitted chunk "p" 930, the small chunks "e," "f," "g," and "h" remain as a big chunk "efgh" 940 and emitted as such because these chunks constitute a previously emitted big chunk as seen before at 920. After the look ahead buffer 910 is refilled starting with the next chunk "ijkl" after the last previously emitted chunk "efgh" 940, the small chunks "i," "j," "k," and "l" remain as a big chunk "ijkl" 945 and are emitted as such because these chunks, as the start of the look ahead buffer 910, constitute a previously emitted big chunk as seen before at 925. After the look ahead buffer 910 is refilled starting with the next chunk "aaab" after the last previously emitted chunk "ijkl" 945, the small chunks "a," "a," "a," and "b" are split up from being a big chunk "aaab" and are all emitted as small chunks "a," "a," "a," and "b" 950 because while the next possible big chunk "bbab" has never been seen before, the last chunk emitted "ijkl" 945 was big and had been seen before at 925. After the look ahead buffer 910 is refilled starting with the next chunk "bbab" after the last previously emitted chunk "b" 950, the small chunks "b," "b," "a," and "b" remain as a big chunk "bbab" 955 and are emitted as such because neither the last chunk emitted, "b" 950, nor the next big chunk "cdkl" 965 are big chunks that have been seen before. The reader will appreciate that a chunk splitting algorithm has no recourse to detecting and re-emitting the large duplicate chunk "abcd" beginning halfway through big chunk "bbab" 955. This may have been possible in a chunk amalgamation algorithm which does an increased amount of querying for duplicate big chunks.

Referring now to the continuation of this exemplary illustration 900 in FIG. 9c, after the look ahead buffer 910 is refilled starting with the next chunk "cdkl" after the last previously emitted chunk "bbab" 955, the small chunks "c," "d," "k," and "l" remain as a big chunk "cdkl" 965 and are emitted as such because the last chunk emitted, "bbab" 955 has never been seen before and the next big chunk "mnop" has never been previously emitted as a big chunk. After the look ahead buffer 910 is refilled starting with the next chunk "mnop" after the last previously emitted chunk "cdkl" 965, the small chunks "m," "n," "o," and "p" are split up from being a big chunk "mnop" and are all emitted as small chunks "m," "n," "o," and "p" 970 because while the previously emitted chunk "cdkl" 965 had never been seen before, the next chunk "ijkl" has been seen before at 945. After the look ahead buffer 910 is refilled starting with the next chunk "ijkl" after the last previously emitted chunk "p" 970, the small chunks "i," "j," "k," and "l" remain as a big chunk "ijkl" 975 and are emitted as such because these chunks, as the start of the look ahead buffer 910, constitute a previously emitted big chunk "ijkl" as seen before at 945. After the look ahead buffer 910 is refilled starting with the next chunk "xxyy" after the last previously emitted chunk "ijkl" 975, the small chunks "x," "x," "y, and "y" are split up from being a big chunk "xxyy" and are all emitted as small chunks "x," "x," "y," and "y" 980 because while the next chunk "zzac" has never been seen before, the previously emitted chunk "ijkl" has been seen before at 975. After the look ahead buffer 910 is refilled starting with the next chunk "zzac" after the last previously emitted chunk "y" 980, the small chunks "z," "z," "a," and "c" remain as a big chunk "zzac" 985 and are emitted as such because the following big chunk "a" has never been seen before, and the previous chunk emitted, "y" 980, was duplicate but not a duplicate big chunk. Finally, after the look ahead buffer 910 is refilled with the remaining small chunk "a" after the last chunk emitted "zzac" 985, the small chunk "a" is simply emitted as such. Applying the claimed second modifying selection function, which consists of a content-defined chunking splitting function according to FIG. 8, to the input data stream 905 has resulted in the modification of chunks provided from the first standard chunking algorithm to be big within long regions of non-duplicate data, small at the borders of long regions of non-duplicate data, and small within short regions of non-duplicate data.

Figure 10:
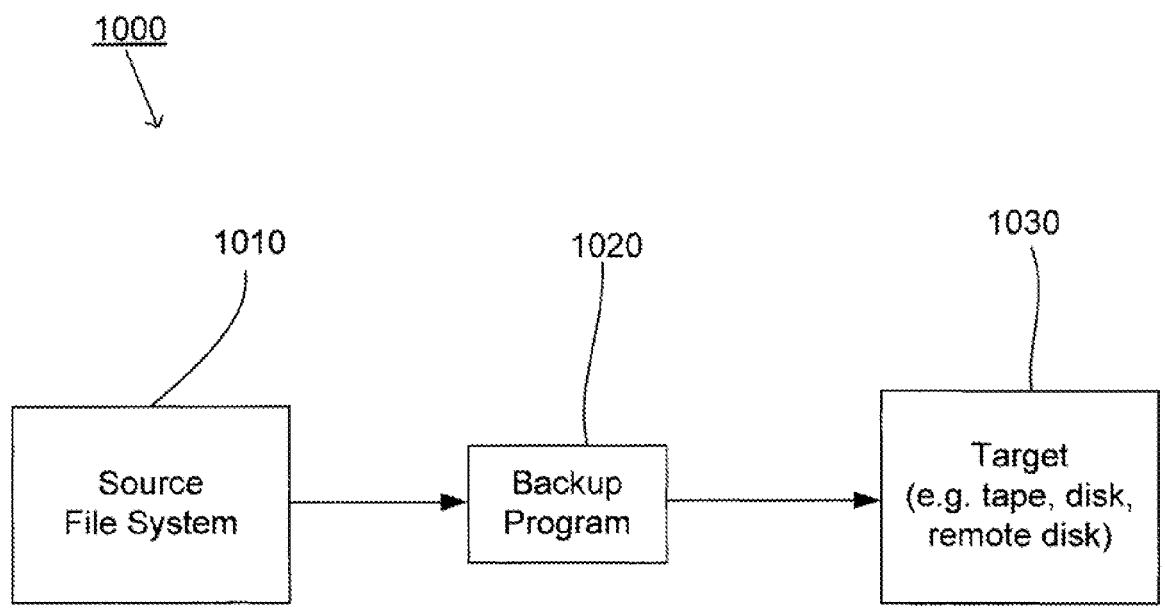
FIG. 10 is an exemplary application of a backup system to which data amalgamation and/or data splitting technique or policy may be applied, according to at least one embodiment.

FIG. 10 is an exemplary application of a content-defined chunking amalgamation policy to an archive or backup system 1000, according to at least one embodiment of the present invention. In this exemplary application of the present invention, a source file system 1010 in, for example, a computer system may be provided and may contain the data set or data stream. This source file system 1010 may be coupled to a backup program 1020. The present invention may be incorporated into the source file system 1010 and/or the backup program, and may operate to provide better data chunking and better duplicate elimination. The backup program 1020 may then input the modified data into a target storage device 1030, for example, a tape, disk, remote disk storage system, etc. One exemplary storage system may be, for example, a Saturn full backup system. Some experimental data results for various exemplary embodiments of the present invention will now be provided.

Now we will turn to a discussion of experimental results and analysis of the invention. The system(s) and method(s) herein and various simulation devices (e.g., tools) allowed us to investigate a class of techniques, procedures or algorithms where we used information about non-emitted smalls (i.e. the small chunks that were not emitted because they were part of some big chunk). A policy based on such information is less desirable, since there will be a large amount of small chunk "metadata" that needs to be stored somehow.

In the test code, we may also be allowed some impractical algorithms of theoretical interest. We maintained Bloom filters for many different types of chunk emission separately: small chunks and big chunks, both emitted and non-emitted. One benefit (for example) is to allow the concept of 'duplicate' data region to include both previously emitted small chunks as well as non-emitted small chunks (that were emitted as part of some previous big chunk emission). An algorithm modified to query non-emitted small chunks may detect duplicate data at a more fine-grained level. The code could also inject false positives into the chunk existence replies, in order to measure the effect of approximately answering existence queries.

We used a data set for testing consisting of approximately 1.16 Terabyte of full backups of hundreds of user directories over a 4 month period. Although we are not certain what the distribution of file types was, only that it was a large set of real data and fairly typical of what might be seen in practice.

A number of tools were developed which eased online simulation of various techniques and/or algorithms so that analysis of very large input data sets is possible. The key idea was to generate a binary 'summary' of the input data. For every small chunk generated at level 9 (averaging 512 bytes per chunk, in theory), we stored the SHA-1 hash of the chunk, as well as the chunk size and actual cut point level[s]. This chunk data was sufficient to re-chunk most input datasets, except for very nonrandom datasets that generate no chunk points at all$_2$. Later versions of our utilities also stored local compression estimates, generated by running every (4k, 8k, 16k, 32k) fixed-size chunk through an LZO compression algorithm and storing a single byte with the percent of original chunk size. Then given the current stream offset and chunk size, we could estimate the compression at arbitrary points in the stream. In this fashion, the 1.1 Terabyte input data could be analyzed as a more portable 60 Gb set of summary information. (Such re-analyses took hours instead of days, largely due to reduced reading from disk.) We could also store the duplicate/non-duplicate status of every level 9 chunk as it was encountered to a separate file.

Within a given algorithm, there are several parameters, such as minimum and maximum chunk size, and trigger level, which may generate different behavior. Breaking apart and amalgamation algorithms also have other parameters, such as k (the number of small chunks in a big chunk), whether variable size big chunks are permitted, etc. When an algorithm is run over the entire 1.1 Terabyte dataset or its compressed summary, we measure the DER, usually as the ratio of input bytes to bytes within stored compressed chunks. The performance of different algorithms on our dataset was measured.

Figure 11:
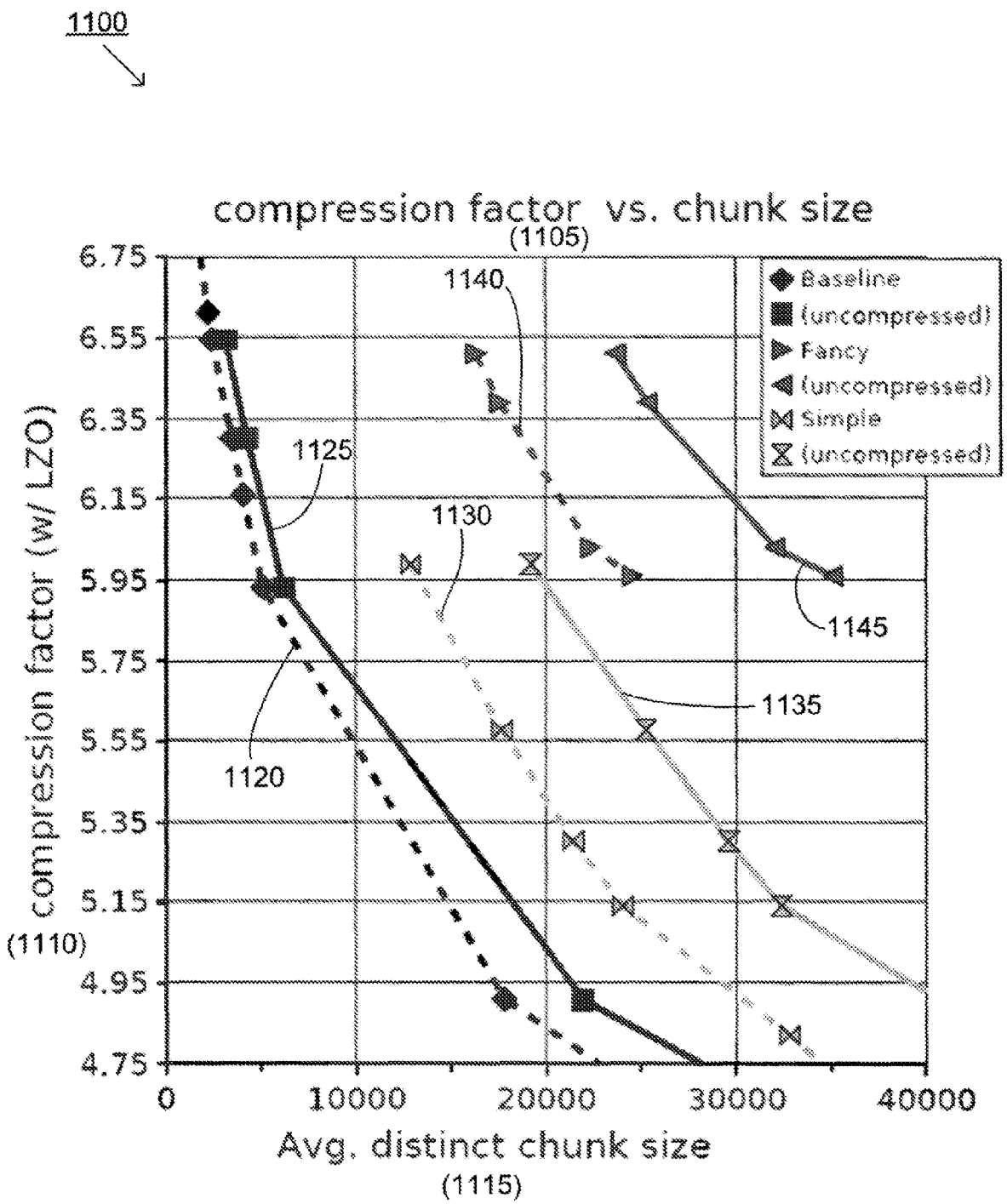
FIG. 11 shows experimental results of compression factor vs. chunk size for various chunking techniques, according to at least one embodiment.

FIG. 11 shows experimental results of compression factor vs. chunk size for various chunking techniques, according to at least one embodiment. FIG. 11 presents a sampling of DER vs. chunk size measurements for three algorithms. For each algorithm, the solid line is the average size of the stored chunks, while the dotted partner is the average compressed size of the same chunks. Larger average chunk sizes compress better. The baseline algorithm 1120 and 1125 varies minimum and maximum chunk sizes as well as the average chunks size. Generally, we kept the chunking level set to produce average chunk length roughly midway between minimum and maximum chunk size, and we used three backup levels of cut-point. A simple amalgamation chunker, running with fixed-size big chunks is shown in the 'Simple' traces 1130 and 1135. The 'Fancy' algorithm 1140 and 1145 has the best performance, but this used Bloom filter queries for chunks which were previously encountered but emitted only as part of a previous big chunk.

Figure 12:
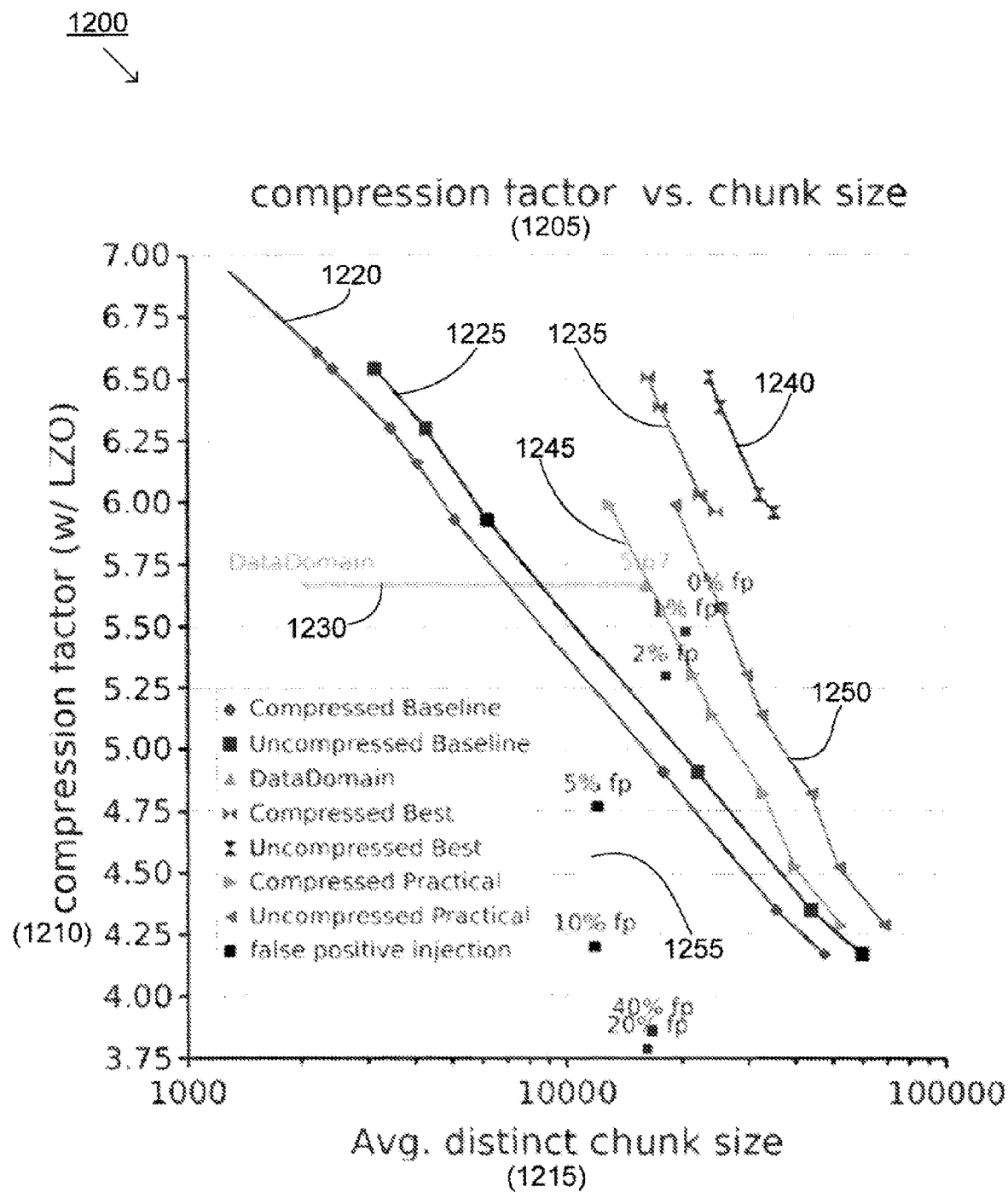
FIG. 12 shows experimental results of compression factor vs. chunk size for various chunking techniques, according to at least one embodiment.

Referring to FIG. 12, experimentally results are shown of compression factor vs. chunk size for various chunking techniques, according to at least one embodiment. FIG. 12 shows more measurements, over a larger range of average chunk sizes than FIG. 11, of the same three algorithms: baseline 1220 and 1225, practical 1245 and 1250, and best 1235 and 1240. We also show the effect of false positive replies to chunk existence queries as the false positive rate is set at 0, 1, 2, 5, 10, 20 and 40%. The horizontal line is the de-duplication performance of a commercial (DataDomain) backup appliance for the same input data (DER=5.67). For this measurement, the average chunk size is unknown, but likely to be somewhere between 4-10 k bytes. The traces marked 'Practical' and 'Best' are the same algorithms as in FIG. 11, but over a wider range of parameters. On a log-scale, trends appear linear over a range of chunk sizes from 1k to 80k. However, this is not a general rule, as limiting behaviors must exist. As the chunk sizes become very large (the lower part of the figure) there was little benefit from modifying the baseline algorithm. To be competitive, we wish to compete with systems having an LBFS-style chunk size around 8k, which yielded a DER around 5.7. We are able to achieve a similar DER with average stored chunk sizes between 20k and 30k. It was tempting to investigate whether approximate queries from a local Bloom filter could form the basis of a practical and scalable archival mechanism. For this to be possible with huge (e.g. Pb) datasets, we investigated the sensitivity of some algorithms to falsely identified duplicates. In all cases, it turned out that DER and chunk size degrade very rapidly, even with 1% of false positive for chunk existence queries. What happens is these falsely generated duplicate/non-duplicate transitions incorrectly generate small chunks. At best, one should restrict such 'local' Bloom filters to high-quality queries of existence in some restricted past, so that no false positives arise. However, if an item is not found in the local Bloom filter, one should still get a definitive answer from the backend storage mechanism. For network transmission, a local Bloom filter approach may be entirely adequate.

We investigated some more complex algorithms that attempted to be smarter about what could be done to prioritize equivalent choices of big chunk if they occurred, but these did not work appreciably better. For example, one variant used some rather complicated logic to prioritize big chunks that start or end on resynchronization points, and tests to use the longest big chunk of equivalent priority. It showed no noticeable improvement. In fact, several such attempts work badly when run on actual data, often for rather subtle reasons.

Figure 13:
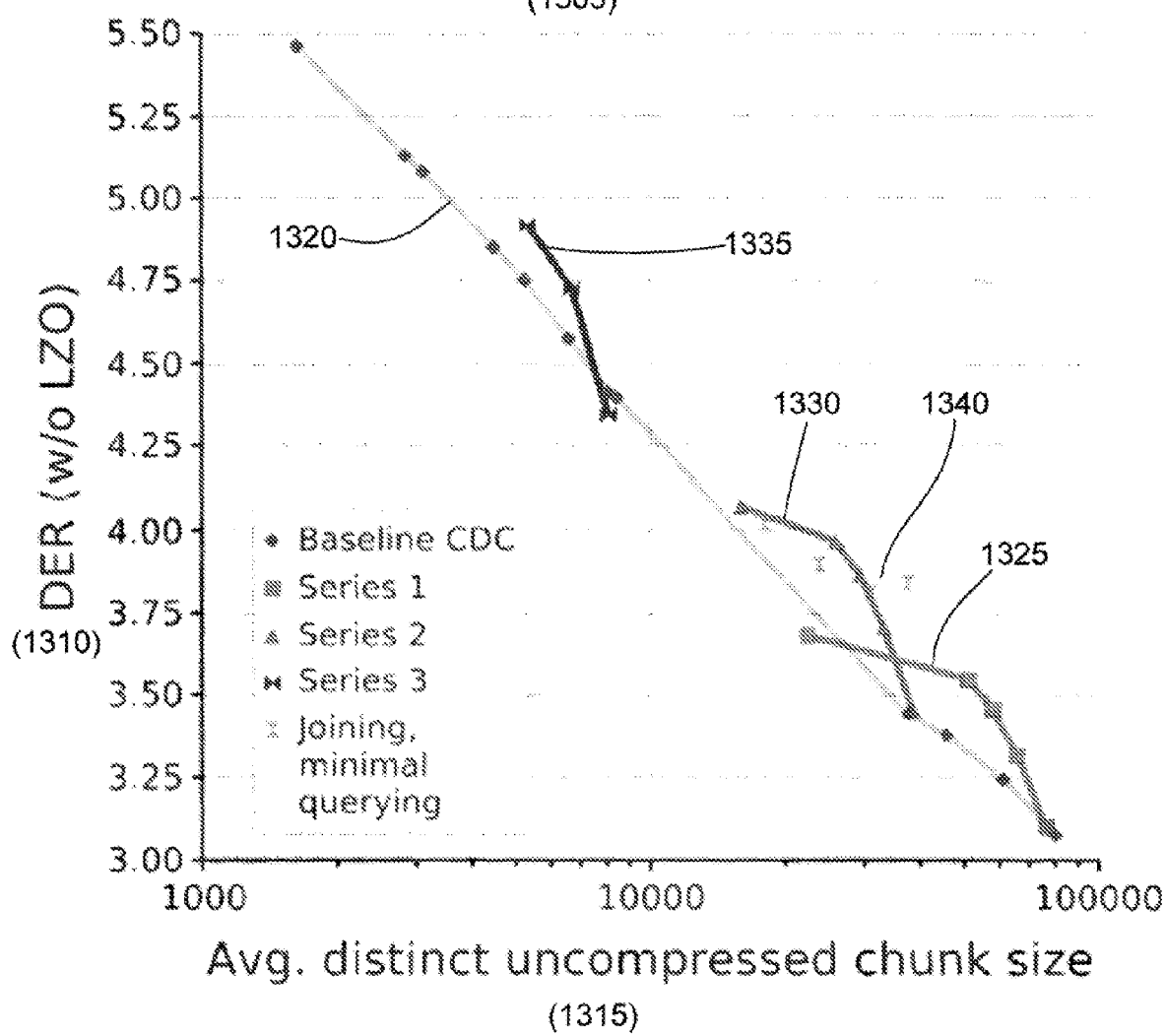
FIG. 13 shows experimental results of breaking apart deduplication ratio vs. chunk size for various chunking techniques, according to at least one embodiment.

Referring to FIG. 13, experimental results are shown of breaking apart de-duplication ratio vs. chunk size for various chunking techniques, according to at least one embodiment. In FIG. 13 we present results with a breaking-apart algorithm, compared to the baseline algorithm 1320. Series 1 1325, Series 2 1330, Series 3 1335 and joining minimal querying 1340 only have nominal improvement over the baseline 1320. The parameter varied for these runs was the number of expected smalls that re-chunking would generate, k. However, to achieve good performance, the parameters of the breaking-apart algorithms must be carefully set. The breaking apart algorithms seem to do particularly well at average chunk sizes of 40-50k. Unfortunately, this regime has somewhat uncompetitive DER. We also show the uncompressed DER for some of the 'Simple' amalgamation algorithm data. We see that the breaking-apart algorithm can be almost as good as the simplest implementations of amalgamation algorithms.

We compared the DER of our dataset using the baseline algorithm when the chunk point selection (see Table I) used hashes based on Rabin, multiplication by a large prime, and a combined boxcar+CRC32c approach, MLCG and combined-CRC32c hashes. We found almost identical duplicate elimination values and average chunk sizes. This corroborates Thaker's observation that with typical data even with a plain boxcar sum to select chunking points generated a reasonably random-like chunk size distribution. He explained this as an indication that there was enough bit-level randomness in the input data itself, so a high-quality randomizing hash was not required for his data.

Now we will discuss the data characteristics of, for example, optimal "always-together" chunks. For our 1.1 Tb dataset, it is also interesting to consider what the best possible arrangement of small chunks would be. It turned out that at the A=512 level of the chunk summary, only approximately 360 million distinct chunks were involved. With care, and translation of the distinct message digests to integer identifiers, it was possible to write other tools to determine some simple chunk amalgamations that used "future knowledge" to determine some theoretical limits for chunking performance.

A simple set of optimization moves is to always amalgamate two chunks that always occurred together. This will not affect the DER at all, but will increase the average chunk size. Iterating this produces that longest possible strings of chunks that always co-occurred. Such amalgamation leaves the DER unaffected, but increases the average chunk size.

In practice, amalgamating often-together or always-together chunks may be a useful background task to optimizing storage. However, an archival backend may not support deletion, and may not provide following-chunk information, so we did not follow this avenue. Instead this experiment provides with a method to judge how well our simple algorithms based on duplicate/non-duplicate transition regions were performing. It was found that this procedure on the raw 'level 9' summary stream increased the average average uncompressed stored chunk size from 576 to 5855 bytes (i.e. the average number of always-co-occurring small chunks was around 10 for this dataset). This 6k size is similar to the chunk size typically used in low-bandwidth network file system (LBFS) style chunking. (See, for example, A. Muthitacharoen, B. Chen and D. Mazieres, "A Low-bandwidth Network File System", (2001), pp. 174-187.)

We also analyzed a larger original chunking with average chunk size around 8k. Amalgamating every pair of always-together chunks resulted in an average stored chunk size of 75397 bytes. Once again, this procedure increased the average stored chunk size by a factor of about 10.

Figure 14:
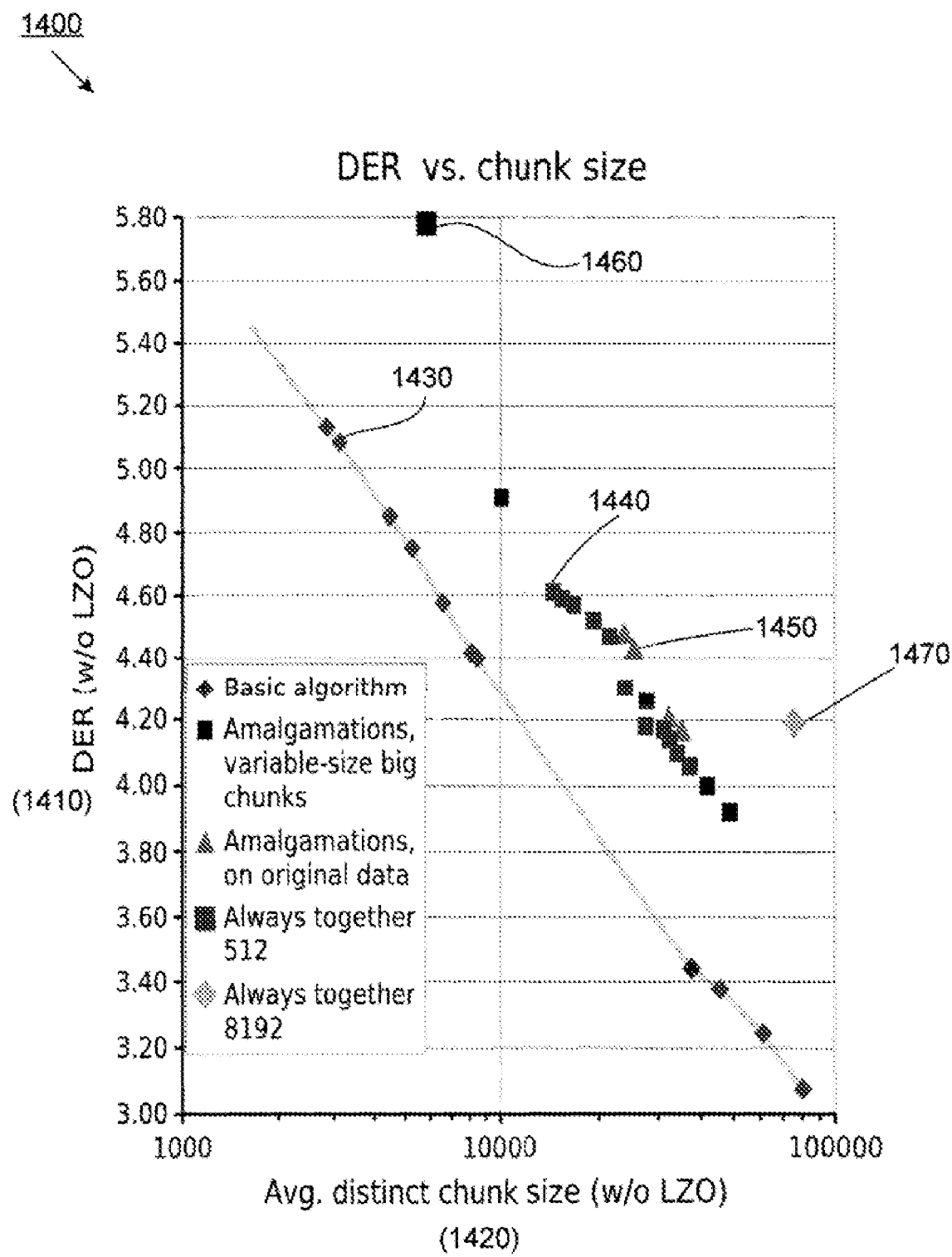
FIG. 14 shows experimental results of DER vs. chunk size for theoretical chunk size limit, according to at least one embodiment.

Referring now to FIG. 14, the graph 1400 puts the previously mentioned 'theoretical' limits in perspective with the baseline chunking algorithm 1430, a number of other variable-size amalgamation runs 1440 and 1450 (a different set from those presented in previous Figures, but with about the same behavior), and various the theoretical chunk size limits 1460 and 1470. In this case, the goal is to increase both DER and chunk-size. As shown, the graph 1400 illustrates the theoretical chunk size limit determined by amalgamating every set of chunks which always co-occurred in our 1.1 Terabyte dataset. This procedure may leave the duplicate elimination ratio (DER) unaffected (ignoring metadata costs), but may increase the average stored chunk size. The graph 1400 places our amalgamation algorithms with variably-sized big chunks, e.g., 1440, about halfway to this particular theoretical chunking limit, for our 1.1 Terabyte dataset.

Although originally formulated based on considerations of simple principles P1 and P2, it is important to judge how well much our real test data input departs from such a simplistic data model. So, an analysis of the actual characteristics and variations in our test data set was considered. We found that the actual input test data deviated quite substantially from an "ideal" dataset adhering to P1 and P2. A simplest-possible dataset adhering to P1 might be expected to have long sequences of contiguous non-duplicate data during a first backup session, followed by long stretches of duplicate data during subsequent runs.

We began the assessment of our test data set by interrogating the summary stream chunked at the 512-byte level, using a bit stream summary of the "current" duplication status of the chunk. The actual histograms of number of contiguous non-duplicate chunks vs. number of contiguous duplicate following chunks (and vice versa) showed an overwhelming and smoothly varying preference to having a single non-duplicate chunk followed by a single duplicate chunk. This may be surprising given the simple principles used to generate the heuristics involved in motivating the present invention. Histograms for the final contiguous numbers of duplicate/non-duplicate chunks (after 14 full backup sessions) were graphed (not shown). Also, surprisingly, the histograms after the first "full" backup were similar in character to those. However, it is noteworthy that such histograms do not suffice for estimating the duplicate elimination ratio of different policies since the number of times a chunk was duplicated was not counted. In conjunction with our measurements that the average size of always-together chunks was around 6k, this assessment suggests that a deeper understanding of the statistical behavior of the test dataset may result in other heuristics that may even be able to outperform the procedures invented herein, particularly for input datasets involving high interspersing of duplicate with non-duplicate chunks. Nevertheless, the improvements found using this 1.1 Tb of test data suggest that the present invention may also achieve robust performance on numerous other real-life datasets having similar non-ideal statistical behaviors.

As noted above, in various embodiments the present invention may be used for data identification and duplicate data elimination. As such, subsequent to determining preferred hash, cut, boundary, chunk, or break points, a hash value for the determined chunk of data may be produced and compared with previously stored hash values. In various embodiments, the present invention may be particularly applicable to data duplication elimination. Further, as also noted above, the present invention may be equally applicable to various electronic systems including wireless networks, the Internet, intranets, computer systems and networks with a string of data that is processed, stored, and/or transmitted and the use of hashing can prove useful. A description is provided below of some of the various systems upon which the present invention may operate.

As noted, in various embodiments, the system(s) and method(s) provided herein may be implemented using a computing device, for example, a personal computer, a server, a mini-mainframe computer, and/or a mainframe computer, etc., programmed to execute a sequence of instructions that configure the computer to perform operations as described herein. In various embodiments, the computing device may be, for example, a personal computer available from any number of commercial manufacturers such as, for example, Dell Computer of Austin, Tex., running, for example, the Windows™ XP™ and Linux operating systems, and having a standard set of peripheral devices (e.g., keyboard, mouse, display, printer).

Figure 15:
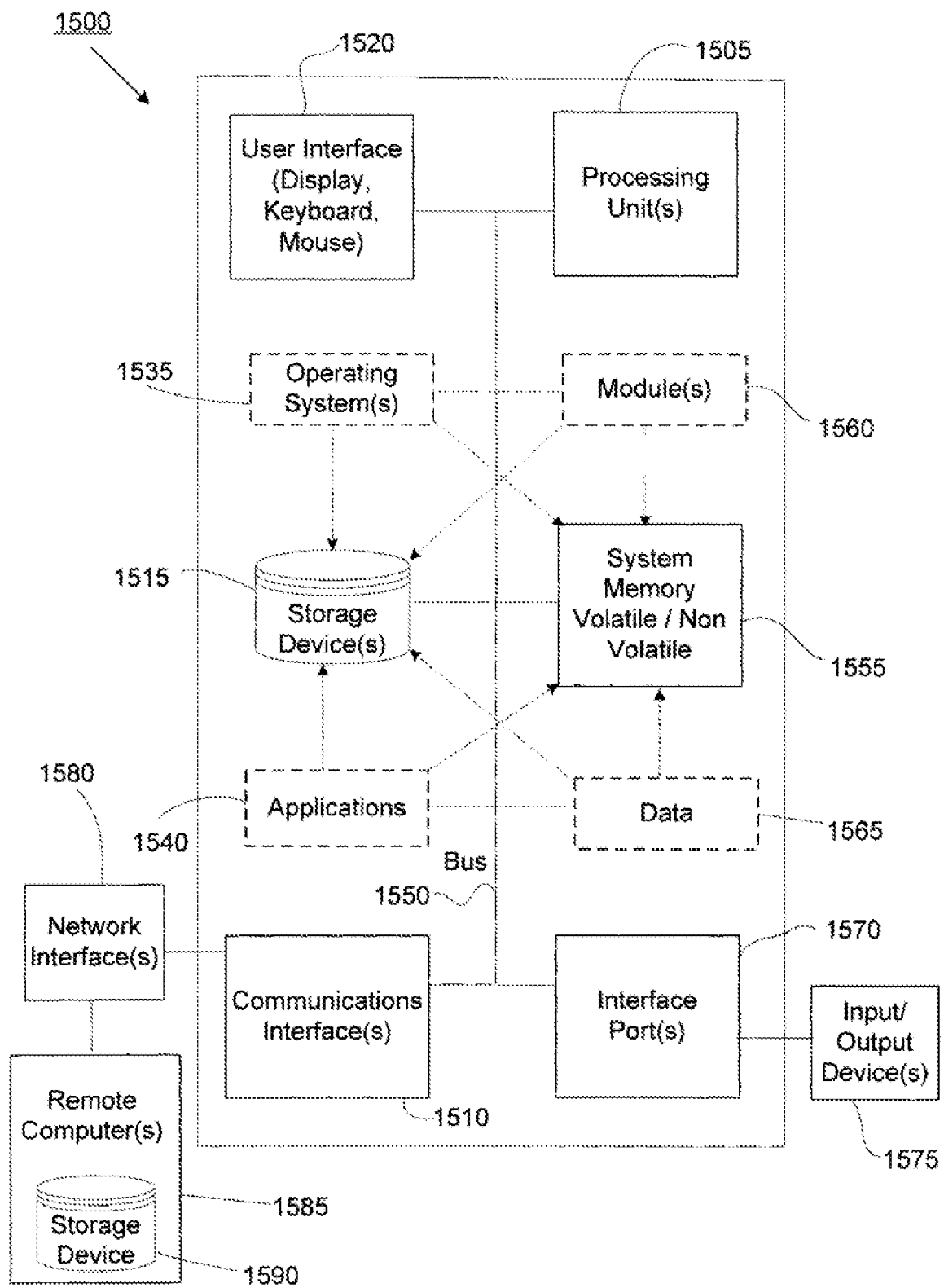
FIG. 15 is an exemplary functional block diagram of a computing device, according to at least one embodiment.

FIG. 15 is a functional block diagram of one embodiment of a computing device 1500 that may be useful for hosting software application programs implementing the system(s) and method(s) described herein. Referring now to FIG. 15, the computing device 1500 may include a processing unit 1505, communications interface(s) 1510, storage device(s) 1515, a user interface 1520, operating system(s) instructions 1535, application executable instructions/API 1540, all provided in functional communication and may use, for example, a data bus 1550. The computing device 1500 may also include system memory 1555, data and data executable code 1565, software modules 1560, and interface port(s). The Interface Port(s) 1570 may be coupled to one or more input/output device(s) 1575, such as printers, scanner(s), all-in-one printer/scanner/fax machines, etc. The processing unit(s) 1505 may be one or more microprocessor(s) or microcontroller(s) configured to execute software instructions implementing the functions described herein. Application executable instructions/APIs 1540 and operating system instructions 1535 may be stored using computing device 1500 on the storage device(s) 1515 and/or system memory 1555 that may include volatile and nonvolatile memory. Application executable instructions/APIs 1540 may include software application programs implementing the present invention system(s) and method(s). Operating system instructions 1535 may include software instructions operable to control basic operation and control of the processor 1505. In one embodiment, operating system instructions 1535 may include, for example, the XP™ operating system available from Microsoft Corporation of Redmond, Wash.

Instructions may be read into a main memory from another computer-readable medium, such as a storage device. The term "computer-readable medium" as used herein may refer to any medium that participates in providing instructions to the processing unit 1505 for execution. Such a medium may take many forms, including, but not limited to, non-volatile media, volatile media, and transmission media. Non-volatile media may include, for example, optical or magnetic disks, thumb or jump drives, and storage devices. Volatile media may include dynamic memory such as a main memory or cache memory. Transmission media may include coaxial cable, copper wire, and fiber optics, including the connections that comprise the bus 1550. Transmission media may also take the form of acoustic or light waves, such as those generated during Radio Frequency (RF) and Infrared (IR) data communications. Common forms of computer-readable media include, for example, floppy disk, a flexible disk, hard disk, magnetic tape, any other magnetic medium, Universal Serial Bus (USB) memory stick™, a CD-ROM, DVD, any other optical medium, a RAM, a ROM, a PROM, an EPROM, a Flash EPROM, any other memory chip or cartridge, a carrier wave as described hereinafter, or any other medium from which a computer can read.

Various forms of computer-readable media may be involved in carrying one or more sequences of one or more instructions to the processing unit(s) 1505 for execution. For example, the instructions may be initially borne on a magnetic disk of a remote computer(s) 1585 (e.g., a server, a PC, a mainframe, etc.). The remote computer(s) 1585 may load the instructions into its dynamic memory and send the instructions over a one or more network interface(s) 1580 using, for example, a telephone line connected to a modem, which may be an analog, digital, DSL or cable modem. The network may be, for example, the Internet, and Intranet, a peer-to-peer network, etc. The computing device 1500 may send messages and receive data, including program code(s), through a network of other computer(s) via the communications interface 1510, which may be coupled through network interface(s) 1580. A server may transmit a requested code for an application program through the Internet for a downloaded application. The received code may be executed by the processing unit(s) 1505 as it is received, and/or stored in a storage device 1515 or other non-volatile storage 1555 for later execution. In this manner, the computing device 1500 may obtain an application code in the form of a carrier wave.

The present system(s) and method(s) may reside on a single computing device or platform 1500, or on multiple computing devices 1500, or different applications may reside on separate computing devices 1500. Application executable instructions/APIs 1540 and operating system instructions 1535 may be loaded into one or more allocated code segments of computing device 1500 volatile memory for runtime execution. In one embodiment, computing device 1500 may include system memory 1555, such as 512 MB of volatile memory and 80 GB of nonvolatile memory storage. In at least one embodiment, software portions of the present invention system(s) and method(s) may be implemented using, for example, C programming language source code instructions. Other embodiments are possible.

Application executable instructions/APIs 1540 may include one or more application program interfaces (APIs). The system(s) and method(s) of the present invention may use APIs 1540 for inter-process communication and to request and return inter-application function calls. For example, an API may be provided in conjunction with a database 1565 in order to facilitate the development of, for example, SQL scripts useful to cause the database to perform particular data storage or retrieval operations in accordance with the instructions specified in the script(s). In general, APIs may be used to facilitate development of application programs which are programmed to accomplish some of the functions described herein.

The communications interface(s) 1510 may provide the computing device 1500 the capability to transmit and receive information over the Internet, including but not limited to electronic mail, HTML or XML pages, and file transfer capabilities. To this end, the communications interface 1510 may further include a web browser such as, but not limited to, Microsoft Internet Explorer™ provided by Microsoft Corporation. The user interface(s) 1520 may include a computer terminal display, keyboard, and mouse device. One or more Graphical User Interfaces (GUIs) also may be included to provide for display and manipulation of data contained in interactive HTML or XML pages.

Figure 16:
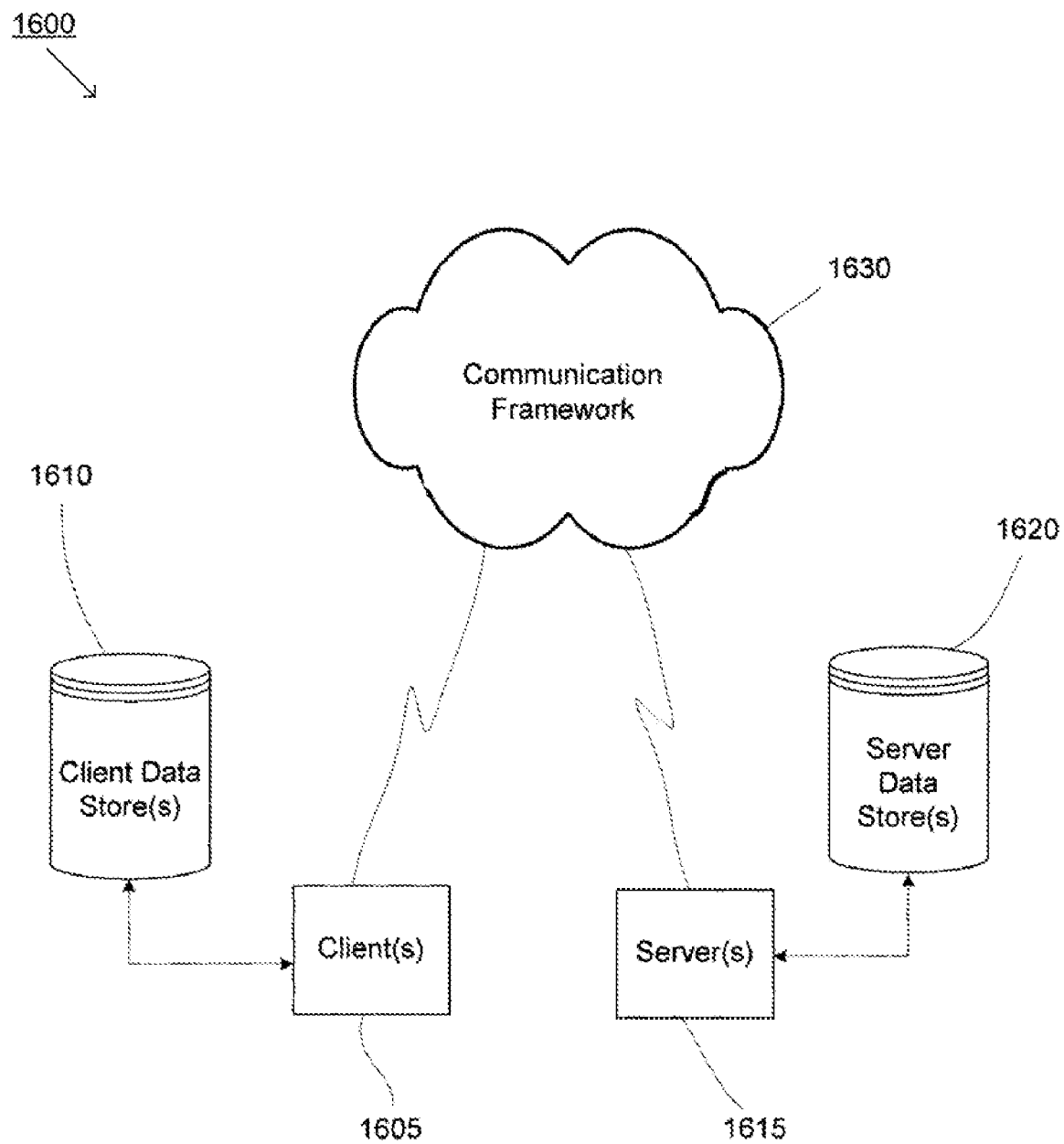
FIG. 16 is an exemplary functional block diagram illustrating a network, according to at least one embodiment.

Referring now to FIG. 16, a network 1600 upon which the system(s) and method(s) may operate, is illustrated. As noted above, the system(s) and method(s) of the present patent application may be operational on one or more computer(s). The network 1600 may include one or more client(s) 1605 coupled to one or more client data store(s) 1610. The one or more client(s) may be coupled through a communication network (e.g., fiber optics, telephone lines, wireless, etc.) to the communication framework 1630. The communication framework 1630 may be, for example, the Internet, and Intranet, a peer-to-peer network, a LAN, an ad hoc computer-to-computer network, etc. The network 1600 may also include one or more server(s) 1615 coupled to the communication framework 1630 and coupled to a server data store(s) 1620. The present invention system(s) and method(s) may also have portions that are operative on one or more of the components in the network 1600 so as to operate as a complete operative system(s) and method(s).

While embodiments of the invention have been described above, it is evident that many alternatives, modifications and variations will be apparent to those skilled in the art. In general, embodiments may relate to the automation of these and other business processes in which analysis of data is performed. Accordingly, the embodiments of the invention, as set forth above, are intended to be illustrative, and should not be construed as limitations on the scope of the invention. Various changes may be made without departing from the spirit and scope of the invention. Accordingly, the scope of the present invention should be determined not by the embodiments illustrated above, but by the claims appended hereto and their legal equivalents All publications, patents, and patent applications cited herein are hereby incorporated by reference in their entirety for all purposes.

We claim:

1. A method of data management implemented in and performed by a computing device utilizing a storage device, the method comprising:

segmenting a data stream using a combination of a first data segmentation procedure and a second data segmentation procedure, wherein an expected average data group size of the first data segmentation procedure and the second data segmentation procedure are different, wherein said first segmentation procedure breaks said data stream into a plurality of data groups, wherein the second data segmentation procedure combines at least two small data groups, from said plurality of data groups, together to make a larger data group having an average size that is larger than average sizes of the small data groups, and wherein the second data segmentation procedure refrains from combining at least two other small data groups together in response to determining that the at least two other small data groups are new and non-duplicate of data previously occurring in the data stream and in response to determining that a data group that is sequentially adjacent to the at least two other small data groups is a duplicate of data previously occurring in the data stream, wherein the at least two other small data groups are consecutive data groups in the plurality of data groups and wherein the second data segmentation procedure combines the at least two small data groups into the larger data group in response to determining that the at least two small data groups are new and non-duplicate of data that has previously occurred in the data stream.

2. The method of claim 1, wherein one or more different small data groups of new data are combined into the larger data group when a maximum predetermined length of the data stream has been reached or processed.

3. The method of claim 1, wherein the data group that is sequentially adjacent to the at least two other small data groups is sequentially before the at least two other small data groups in the data stream.

4. The method of claim 1, wherein the data group that is sequentially adjacent to the at least two other small data groups is sequentially after the at least two other small data groups in the data stream.

5. The method of claim 1, wherein the data group that is sequentially adjacent to the at least two other small data groups is sequentially before or after the at least two other small data groups in the data stream.

6. The method of claim 1, further comprising the step of:
emitting one or more small data group(s) or one or more larger data group(s).

7. The method of claim 6, wherein a larger data group is only emitted if a resynchronization point is not crossed.

8. The method of claim 1, wherein the second data segmentation procedure is not applied to at least one small data group when no larger data group ending with the at least one small data group is considered to be a duplicate, when an immediately following number of data groups are of a predetermined type, or an immediately following amount of data is considered to be duplicate data.

9. A method of data management, implemented in and performed by a computing device utilizing a storage device, the method comprising:

segmenting a data stream using a combination of a first data segmentation procedure and a second data segmentation procedure, wherein an expected average data group size of the first data segmentation procedure and the second data segmentation procedure are different, wherein said first segmentation procedure breaks said data stream into a plurality of data groups, wherein the second data segmentation procedure refrains from breaking apart a given data group of said plurality of data groups in response to determining that said given data group is non-duplicate of data previously occurring in the data stream, and wherein the second data segmentation procedure further breaks apart at least one of the plurality of data groups that is sequentially adjacent to said given data group into smaller data groups in response to determining that said at least one of the plurality of data groups is non-duplicate of data previously occurring in the data stream and in response to determining that a data group that is sequentially adjacent to said at least one of the plurality of data groups is a duplicate of data previously occurring in the data stream.

10. The method of claim 9, wherein the first segmentation procedure has a larger average data group size than the second segmentation procedure.

11. The method of claim 9, further comprising the step of:
emitting one or more small data group(s) or one or more larger data group(s).

* * * * *